US009246914B2

(12) United States Patent
Boldyrev et al.

(10) Patent No.: US 9,246,914 B2
(45) Date of Patent: Jan. 26, 2016

(54) METHOD AND APPARATUS FOR PROCESSING BIOMETRIC INFORMATION USING DISTRIBUTED COMPUTATION

(75) Inventors: Sergey Boldyrev, Söderkulla (FI); Ian Justin Oliver, Söderkulla (FI); Vesa-Veikko Luukkala, Espoo (FI); Sampo Juhani Sovio, Riihimäki (FI)

(73) Assignee: Nokia Technologies Oy, Espoo (FI)

( * ) Notice: Subject to any disclaimer, the term of this patent is extended or adjusted under 35 U.S.C. 154(b) by 1014 days.

(21) Appl. No.: 13/108,596

(22) Filed: May 16, 2011

(65) Prior Publication Data

US 2012/0016662 A1 Jan. 19, 2012

Related U.S. Application Data

(60) Provisional application No. 61/365,084, filed on Jul. 16, 2010.

(51) Int. Cl.
*H04L 29/06* (2006.01)
*G10L 17/00* (2013.01)
*G07C 9/00* (2006.01)
*G06F 9/50* (2006.01)

(52) U.S. Cl.
CPC .......... *H04L 63/0861* (2013.01); *G06F 9/5066* (2013.01); *G10L 17/00* (2013.01); *G07C 9/00071* (2013.01)

(58) Field of Classification Search
CPC ... G06F 9/5061; G06F 9/5066; G06F 9/5027; G06F 9/5083; H04L 67/1002; H04L 67/1008; G07C 9/00071; G10L 17/00; G10L 17/005; G10L 17/22; G10L 17/24
See application file for complete search history.

(56) References Cited

U.S. PATENT DOCUMENTS

| 5,036,539 A | * | 7/1991 | Wrench et al. | 704/246 |
| 5,663,727 A | * | 9/1997 | Vokac | 341/132 |
| 6,128,657 A | * | 10/2000 | Okanoya et al. | 709/224 |

(Continued)

FOREIGN PATENT DOCUMENTS

| CN | 101201894 A | 6/2008 |
| WO | WO 2008/095761 A1 | 8/2008 |

OTHER PUBLICATIONS

Balandin, S., et al. "Multimedia Services on top of M3 Smart Spaces" IEEE Region 8 SIBIRCON—2010, Irkutsk Listvyanka, Russia, Jul. 11-15, 2010, pp. 1-6.

(Continued)

*Primary Examiner* — Eric Yen
(74) *Attorney, Agent, or Firm* — Alston & Bird LLP

(57) ABSTRACT

An approach is provided for providing biometric information processing using distributed computation. A biometric information processing infrastructure determines to receive an input including, at least in part, biometric information. The biometric information processing infrastructure selects one or more analyses for processing the input. The biometric information processing infrastructure also determines one or more processes associated with the one or more analyses. The biometric information processing infrastructure further determines to derive one or more computation closures from the one or more processes. The biometric information processing infrastructure determines to decompose the one or more computation closures for distribution in one or more computation spaces.

22 Claims, 16 Drawing Sheets

(56) References Cited

U.S. PATENT DOCUMENTS

| | | | |
|---|---|---|---|
| 6,173,259 B1 | 1/2001 | Bijl et al. | |
| 6,185,602 B1* | 2/2001 | Bayrakeri | 709/204 |
| 6,282,658 B2* | 8/2001 | French et al. | 726/7 |
| 6,327,568 B1 | 12/2001 | Joost | |
| 6,393,305 B1* | 5/2002 | Ulvinen et al. | 455/563 |
| 6,418,462 B1* | 7/2002 | Xu | 709/201 |
| 6,539,059 B1* | 3/2003 | Sriram et al. | 375/240.25 |
| 6,793,498 B1* | 9/2004 | Nunes | 434/322 |
| 6,807,483 B1* | 10/2004 | Chao et al. | 701/411 |
| 6,848,109 B1* | 1/2005 | Kuhn | 719/315 |
| 7,137,126 B1* | 11/2006 | Coffman et al. | 719/328 |
| 7,209,885 B1* | 4/2007 | Shono et al. | 704/500 |
| 7,418,390 B1* | 8/2008 | Jokipii | 704/270.1 |
| 7,797,368 B1* | 9/2010 | Gadkari | 709/201 |
| 2002/0032875 A1* | 3/2002 | Kashani | 713/300 |
| 2002/0133461 A1 | 9/2002 | Ramachandran | |
| 2002/0188854 A1 | 12/2002 | Heaven et al. | |
| 2002/0194245 A1* | 12/2002 | Simpson et al. | 709/101 |
| 2003/0074402 A1* | 4/2003 | Stringer-Calvert et al. | 709/203 |
| 2003/0105623 A1 | 6/2003 | Cyr et al. | |
| 2003/0139930 A1* | 7/2003 | He et al. | 704/270.1 |
| 2004/0006482 A1* | 1/2004 | Geppert et al. | 704/277 |
| 2004/0133927 A1* | 7/2004 | Sternberg et al. | 725/136 |
| 2004/0255295 A1* | 12/2004 | Stackhouse et al. | 718/100 |
| 2005/0041788 A1 | 2/2005 | Jan et al. | |
| 2005/0049877 A1* | 3/2005 | Agranat | 704/270 |
| 2005/0086059 A1* | 4/2005 | Bennett | 704/270 |
| 2006/0009980 A1 | 1/2006 | Burke et al. | |
| 2006/0016869 A1* | 1/2006 | Bonalle et al. | 235/380 |
| 2006/0048020 A1* | 3/2006 | Newport et al. | 714/49 |
| 2006/0072727 A1* | 4/2006 | Bantz et al. | 379/201.04 |
| 2006/0129838 A1 | 6/2006 | Chen et al. | |
| 2007/0094023 A1 | 4/2007 | Gallino et al. | |
| 2007/0271569 A1* | 11/2007 | Ohlgren et al. | 718/104 |
| 2008/0010067 A1 | 1/2008 | Chaudhari et al. | |
| 2008/0031496 A1 | 2/2008 | Takagi | |
| 2008/0317292 A1 | 12/2008 | Baker et al. | |
| 2009/0089560 A1* | 4/2009 | Liu et al. | 712/226 |
| 2009/0152343 A1 | 6/2009 | Carter et al. | |
| 2011/0041136 A1* | 2/2011 | Messier et al. | 718/105 |
| 2011/0093852 A1* | 4/2011 | Li et al. | 718/100 |
| 2011/0179177 A1* | 7/2011 | Alcorn et al. | 709/226 |
| 2011/0246994 A1* | 10/2011 | Kimbrel et al. | 718/102 |
| 2012/0042003 A1* | 2/2012 | Goetz et al. | 709/203 |
| 2013/0332612 A1* | 12/2013 | Cai et al. | 709/226 |

OTHER PUBLICATIONS

Boldyrev, S., et al. "Network and content aware information management" Nokia Research Centre, Ubiquitous Architectures, pp. 1-8.

International Search Report for PCT Application No. PCT/FI2011/050554 dated Nov. 8, 2011, pp. 1-6.

Satyanarayanan, M., et al. "The Case for VM-Based Cloudlets in Mobile Computing" IEEE Pervasive Computing 2009, pp. 1-10.

Written Opinion for PCT Application No. PCT/FI2011/050554 dated Nov. 8, 2011, pp. 1-9.

* cited by examiner

METHOD AND APPARATUS FOR PROCESSING BIOMETRIC INFORMATION USING DISTRIBUTED COMPUTATION

RELATED APPLICATIONS

This application claims the benefit of the earlier filing date under 35 U.S.C. §119(e) of U.S. Provisional Application Ser. No. 61/365,084 filed Jul. 16, 2010, entitled "Method and Apparatus for Processing Biometric Information Using Distributed Computation," the entirety of which is incorporated herein by reference.

BACKGROUND

Service providers (e.g., wireless, cellular, etc.) and device manufacturers are continually challenged to deliver value and convenience to consumers by, for example, providing compelling network services. One area of interest has been the development of information and computation spaces (e.g., smart spaces) for distributed information management and computing. By way of example, it is noted that various devices (e.g., mobile devices) with various methods of connectivity are now for many people becoming the primary gateway to the internet and also a major storage point for personal information. This is in addition to the normal range of personal computers and furthermore sensor devices plus internet based providers. Combining these devices together and the applications and the information stored by those applications is a major challenge of interoperability. This can be achieved through numerous, individual and personal information or computation spaces in which persons, groups of persons, etc. can place, share, interact and manipulate webs of information with their own locally agreed semantics without necessarily conforming to an unobtainable, global whole. With the growing use of such information and computation spaces, service providers and device manufacturers are challenged to leverage these information and computation spaces to support complex calculations used in resource intensive applications such as processing biometric information (e.g., natural language processing, voice recognition, and identity determination).

SOME EXAMPLE EMBODIMENTS

Therefore, there is a need for an approach for efficiently providing biometric information processing using distributed information and computation at the level of one or more information or computation spaces.

According to one embodiment, a method comprises determining to receive an input including, at least in part, biometric information. The method also comprises determining one or more analyses for processing the input. The method further comprises determining one or more processes associated with the one or more analyses. The method also comprises determining to derive one or more computation closures from the one or more processes. The method further comprises determining to decompose the one or more computation closures for distribution in one or more computation spaces.

According to another embodiment, an apparatus comprising at least one processor, and at least one memory including computer program code for one or more programs, the at least one memory and the computer program code configured to, with the at least one processor, cause, at least in part, the apparatus to determine to receive an input including, at least in part, biometric information. The apparatus is also caused to determine one or more analyses for processing the input. The apparatus is further caused to determine one or more processes associated with the one or more analyses. The apparatus is also caused to determine to derive one or more computation closures from the one or more processes. The apparatus is further caused to determine to decompose the one or more computation closures for distribution in one or more computation spaces.

According to another embodiment, a computer-readable storage medium carrying one or more sequences of one or more instructions which, when executed by one or more processors, cause, at least in part, an apparatus to determine to receive an input including, at least in part, biometric information. The apparatus is also caused to determine one or more analyses for processing the input. The apparatus is further caused to determine one or more processes associated with the one or more analyses. The apparatus is also caused to determine to derive one or more computation closures from the one or more processes. The apparatus is further caused to determine to decompose the one or more computation closures for distribution in one or more computation spaces.

According to another embodiment, an apparatus comprises means for determining to receive an input including, at least in part, biometric information. The apparatus also comprises means for determining one or more analyses for processing the input. The apparatus further comprises means for determining one or more processes associated with the one or more analyses. The apparatus also comprises means for determining to derive one or more computation closures from the one or more processes. The apparatus further comprises means for determining to decompose the one or more computation closures for distribution in one or more computation spaces.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
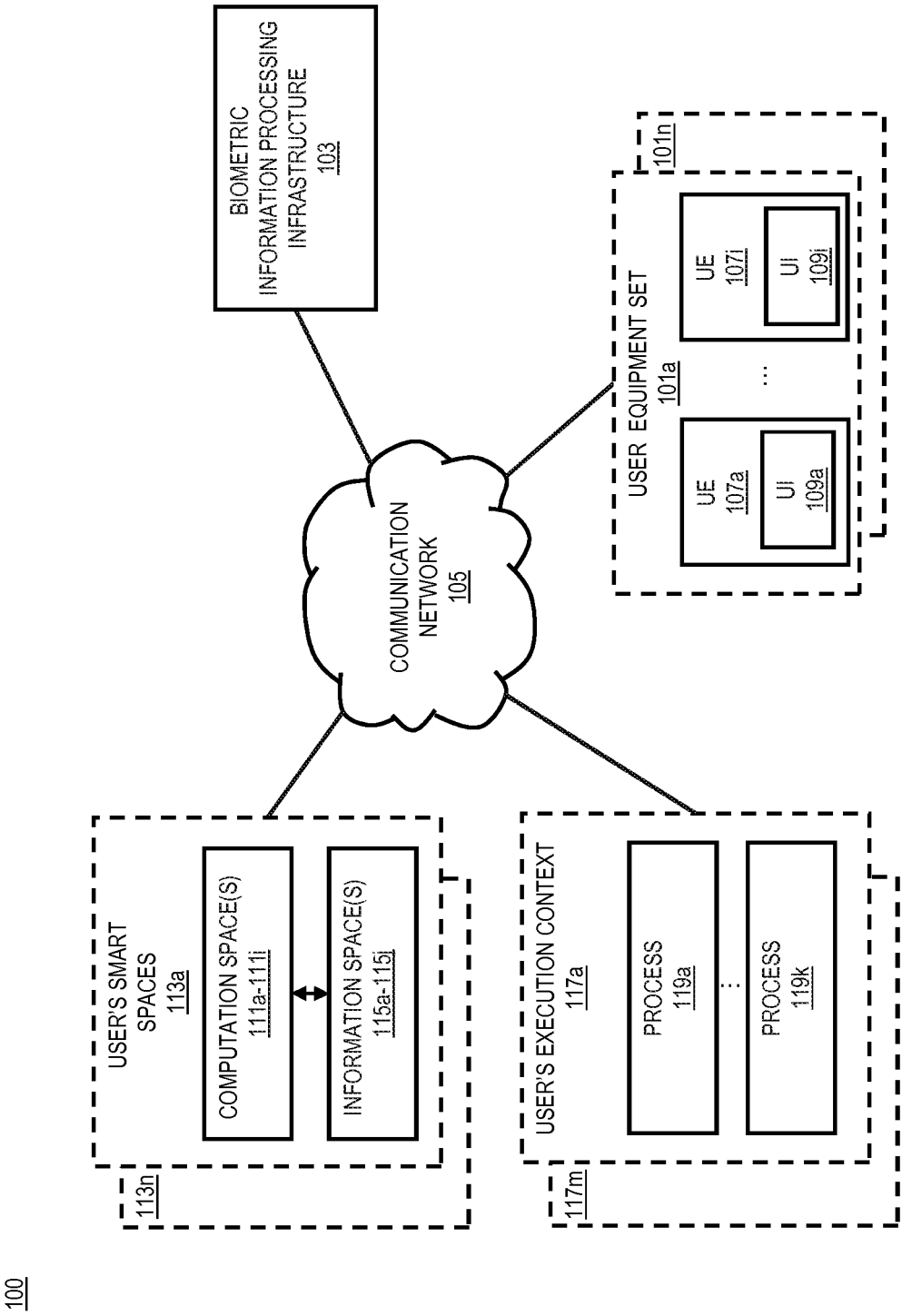
FIG. 1 is a diagram of a system capable of providing biometric information processing using distributed computation, according to one embodiment.

Examples of a method, apparatus, and computer program for providing biometric information processing using distributed computation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term biometric information refers to any kind of information based upon one or more intrinsic physical or behavioral traits of humans, animals, or other natural phenomena. By way of example, biometric information includes both physiological characteristics (e.g., fingerprints, face recognition, genetic materials, palm prints, iris/retina scans, odor/scent, etc.) and behavioral characteristics (e.g., voice, natural language, sound, gait, typing rhythm, etc.). Although various embodiments are discussed with respect to processing biometric information that includes natural language and/or voice input, it is contemplated that the approached described herein for processing information using distributed computation closures is applicable to any type of biometric information.

As used herein, the term information space refers to an aggregated information set from different sources. This multi-sourcing is very flexible since it accounts and relies on the observation that the same piece of information can come from different sources. For example, the same information (e.g., contact information for a particular contact) can appear in the same information space from multiple sources (e.g., a locally stored contacts database, a public directory, a work contact database, etc.). In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats.

As used herein, the term reflective computing refers to the capability of a system to reason or act upon itself. A reflective system is a system that provides a representation of its own behavior which is amenable to inspection and adaptation. Reflection enables both inspection and adaptation of systems at run time. Inspection allows the current state of the system to be observed while adaptation allows the system's behavior to be altered at run time to better. Although various embodiments are described with respect to reflective computing, it is contemplated that the approach described herein may be used with other computation systems and architectures.

As used herein, the term granular processing refers to how finely a particular computational process is subdivided (e.g., a minimum unit of code that can be used to perform a task or function of the process). By way of example, granularity (e.g., a minimum level of granularity, different levels of granularity, etc.) of the processes can be defined by the developer of the process or can be dynamically determined by a system.

As used herein, the term computation closure identifies a particular computation procedure together with relations and communications among various processes including passing arguments, sharing process results, flow of data and process results, etc. The computation closures (e.g., a granular reflective set of instructions, data, and/or related execution context or state) provide the capability of slicing of computations for processes and transmitting the computation slices between devices, infrastructures and information spaces.

As used herein, the term computation space refers to an aggregated set of computation closures from different sources. In one embodiment, computations within the computation space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc.

As used herein, the term smart space refers to a combination of one or more information spaces and one or more computation spaces, wherein the computation spaces comprise computation closures that operate on the information in the information spaces. Although various embodiments are described with respect to information spaces, computation spaces and RDF, it is contemplated that the approach described herein may be used with other structures and conceptual description methods used to create models of information and computation.

FIG. 1 is a diagram of a system capable of providing biometric information processing using distributed computation, according to one embodiment. As previously described, a smart space consists of information and computation spaces each consisting of several distributed devices that communicate information and computation closures (e.g. RDF graphs) via one or more shared memories. A device within a computation space environment may store computation closures locally in its own memory space or publish computation closures on a globally accessible environment within the smart space. In the first case, the device is responsible for any process needed for combination or extraction of computations, while in the second case the processes can be conducted by the globally accessible environment. However, in many cases, the computation closures may be organized as lists or sets that can include many computation elements (e.g., computation closures related to natural language processing, voice recognition, etc.).

In one embodiment, information and/or computation space technology provide access to distributed computations and information for various devices within the scope of the smart space, in such a way that the distributed nature of the computations is hidden from users and it appears to a user as if all the computations are performed on the same device. The computation space also enables a user to have control over computation distribution by transferring computations between devices that the user has access to. For example, a user may want to transfer computations among work devices, home devices, and portable devices. Furthermore, the computation spaces enables a computing environment to break complex and resource consuming computations into smaller and/or simpler sub-processes and have the sub-process computations performed over multiple available run-time environments and the computation results aggregated.

Biometric information processing such as natural language processing, voice recognition, etc. are examples of complex computations involving resource consuming computations which if distributed over multiple run-time environments, their response time and the quality of the response can greatly improve. Current technologies enable a mobile device to manipulate contexts such as data and information via the elements of a user interface of the device. However, distribution of computations and processes related to or acting on the data and information within the information space is not supported. In other words, an information space in general does not provide a user equipment with the ability to control distribution of related computations and processes of, for instance, applications acting on the information owned by the user. For example, a contact management application that processes contact information distributed within one or more information spaces generally executes on a single device (e.g., with all processes and computations of the application also executing on the same device) to operate on the distributed information. In some cases (e.g., when computations are complex, the data set is large, etc.), providing a means to also distribute the related computations in addition to the information space is advantageous.

This goal is achieved by introduction of the capability to construct, distribute, and aggregate computations as well as their related data. More specifically, to enable a user equipment which connects to the smart space, to distribute computations associated with biometric information processing among other devices with access to the information space, each computation is deconstructed to its basic or primitive processes or computation closures. Once a computation is divided into its primitive computation closures, the processes within or represented by each closure may be executed in a distributed fashion and the processing results can be collected and aggregated into the result of the execution of the initial overall computation.

In one embodiment, each high context set of computations associated with biometric information processing can be represented as closed sets of processes (e.g. transitive closures) such that closures can be executed separately (e.g. through distributed processing equipments). The transitive closures can be traversed in order to present the granular reflective processes attached to each particular execution context. The mechanism of computation spaces environment provides distributed deductive closures as a recyclable set of pre-computed, computation closures that can be distributed among various devices and infrastructures or being shared among the users of one or more smart space by being stored on any storage locations related to the information spaces associated with the smart spaces.

In another embodiment, the provided distributed computations associated with biometric information processing may be archived in one or more repositories throughout the computation space to be accessible for future use. In this embodiment, the smart spaces may search the repositories for previously generated standalone computations before attempting to generate them. This mechanism provides recyclable computations that can be retrieved and combined into sets to be utilized for providing various services.

In yet another embodiment, the biometric information can be used to determine access to content, processes, information, closures, and the like that may be restricted or otherwise limited to a particular user. In other words, the biometric information can be associated with an identity of a particular user or set of users and then be used to authenticate access to the content, processes, information, etc. that may be private to the user or the set of users. For example, under the approach describe herein, a user may make a natural language input into a mobile device requesting access to a private folder. The input can be parsed to determine specific commands to access the folder as well as to determine the biometric information in the natural language input to authenticate access to the private folder.

As shown in FIG. 1, the system 100 comprises one or more sets 101a-101n of user equipment (UEs) UE 107a-107i, each having connectivity to a biometric information processing infrastructure 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). Additionally, each UI element may be bound to a context/process by granular migration. In one embodiment, granular migration enables processes to be implicitly or explicitly migrated between devices, computation spaces, and other infrastructure. The process migration can be initiated for example by means of single-cast (e.g., to just another UE 107) or multicast (e.g., to multiple other UEs 107). Additionally, process migration may be triggered via gesture recognition, wherein the user preselects a particular set of UI elements and makes a gesture to simulate "pouring" the selected UE elements from one device to another.

As seen in FIG. 1, a user of UEs 107*a*-107*i* may own, use, or otherwise have access to various pieces of computations distributed over a smart space 113*a* of computation spaces 111*a*-111*i* and information spaces 115*a*-115*j* where each of the one or more computation spaces 111*a*-111*i* include one or more computation closures. The user can access the computations via the set 101*a* consisting of UEs 107*a*-107*i* wherein each UE 107*a*-107*i* is equipped with one or more user interfaces (UI) 109*a*-109*i*. Furthermore, each UE 107*a*-107*i* may have access to execution context 117*a* consisting of processes 119*a*-119*k* that can be used to manipulate the information stored in information spaces 115*a*-115*j* and produce results requested by the user of the UE 107.

In one embodiment, the biometric information processing infrastructure 103 consists of information about execution contexts 117*a* and processes 119*a*-119*k* associated with biometric information processing for the UEs 107*a*-107*i*. For examples where the biometric information includes natural language, the information may include input parameters, input types and formats (e.g. voice pitch, audio type, audio file format, etc.), output types and formats (e.g. sound, text, etc.), process structure, flow of data, communication means and parameter passing among processes 119*a*-119*k*, etc.

The computations information enables a UE 107*a*-107*i* to divide computations into their primary computation closures, wherein each computation closure can be executed separately from other computation closures belonging to the same computation. For example, computations related to a voice to text conversion may be divided into computations such as storing the input voice in a file, filtering background noise, performing analyses such as signal processing, semantic analysis, pitch analysis, etc. on the input file, determine required processes for conversion, dividing processes into sub-processes, constructing computation closures for sub-processes, distribute computation closures among available run-time environments based on the work load, etc. In one embodiment, the computation closures derived from the processes 119*a*-119*k* may be stored in the computation spaces 111*a*-111*i* and executed independently from each other. Following execution of the independent processes, the data and parameters resulting from the execution can be exchanged to be able to aggregate results and make operation of the voice to text conversion available in a smart space environment. Moreover, division of the conversion-related computations into independent processes may vary based on factors such as characteristics of the UE, the sound file type, the recorder type and requirements, etc. In one embodiment, division of computations into their primary processes or computation closures is managed by the biometric information processing infrastructure 103. In addition, the computation closures are serialized into, for instance, an information syntax such as RDF triples before being stored via a computation space.

By way of example, the UEs 107*a*-107*i* of sets 101*a*-101*n*, biometric information processing infrastructure 103, and the smart spaces 113*a*-113*n* communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
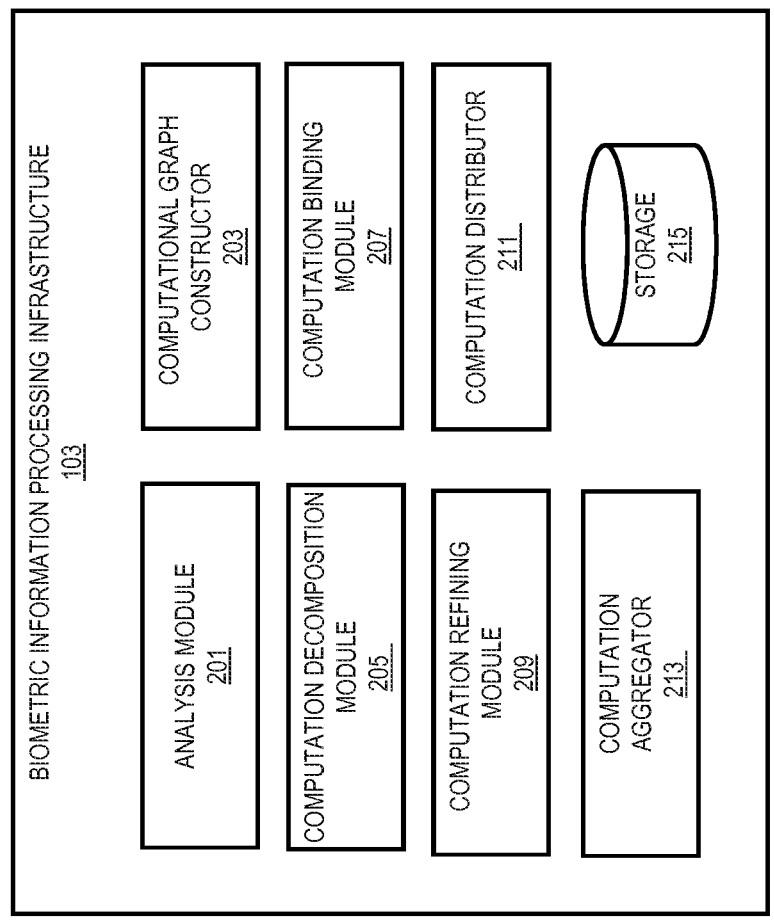
FIG. 2 is a diagram of the components of a biometric information processing infrastructure, according to one embodiment.

FIG. 2 is a diagram of the components of a biometric information processing infrastructure, according to one embodiment. By way of example, the biometric information processing infrastructure 103 includes one or more components for construction and aggregation of distributed computations involved in providing biometric information processing (e.g., natural language processing and/or voice recognition). It is contemplated that the functions of these components may be combined in one or more components or performed by other components of equivalent functionality. In this embodiment, the biometric information processing infrastructure 103 includes an analysis module 201, a computational graph constructor 203, a closure definition module 205, a computation binding module 207, a computation decomposition module 209, a computation refining module 211, a computation distributor 213, a computation aggregator 215, and a storage 217.

In one embodiment, the biometric information processing infrastructure 103 receives a request for a biometric related computation distribution. In one embodiment, the request may have been generated by a UE 107*a*-107*i* based on a user gesture such as for example pushing an icon of the UI 109 towards another UE 107*a*-107*i* which may indicate that the user wants the computation associated with the icon to be executed in the other UE 107*a*-107*i*. In another embodiment, the request for computation distribution may be generated by a component of an information space linked to the UE 107*a*-107*i*, by an independent component having connectivity to the UEs 107*a*-107*i* and the information spaces via the communication network 105, or a combination thereof.

The request for computation distribution may include information about the computation that is going to be distributed, including input, expected output characteristics (e.g., format), processing requirements, etc. The request may also include information about the origin and the destination of a computation. For example, a user may want to distribute the computations associated with converting an audio file into a text (a typically highly processor and resource intensive task). In this example, the audio file may be stored in the user's information space 115a-115j or otherwise available over the communication network 105 (e.g., downloaded from a source over the Internet), and therefore accessible from the UEs 107a-107i. Accordingly, the user may make a manual request to distribute the computations associated with the audio encoding to one or more other devices, a backend server, cloud computing components, and/or any other component capable of performing at least a portion of the conversion functions. By way of example, the manual request may be made via a graphical user interface by dragging an icon or other depiction of the computations to command areas depicted in the user interface. These command areas, for instance, may be representative of physical or virtual locations of the other UEs 107a-107i or devices that can support or perform the distributed computations. In other cases, the distribution can be initiated automatically by the system 100 based on one or more criteria via a request generator (not shown) in conjunction with the biometric information processing infrastructure 103.

In one embodiment, following the receipt of the computation distribution request, the analysis module 201 retrieves and analyzes the information regarding the input file and the requested execution context and, determines the execution components involved in the computation. For the above example, the execution context may include noise filtering, pitch analysis, related settings, parameters, memory states, etc. The identified execution context may be stored in a local storage 215, in a storage space associated with the information space 113a-113n, sent directly to the computational graph constructor 203, or a combination thereof. In some embodiments, the analysis module 201 can also determine a user identity (e.g., user account, information access rights, available services, service subscriptions, etc.) based on the input file. The determined identity can then be used to select the available processes, computations, and/or the nodes over which execution context can be distributed. For example, the user identity may indicate that the user has a subscription to premium network resources (e.g., knowledge processors, data stores, etc.) that can support a given execution context.

In another embodiment, the computational graph constructor 203 generates a computational graph consisting of the processes that need to be performed in order for the requested computation to be completed. The graph may also consist of the workload required for each process such as the processing power, the memory, etc.

In yet another embodiment, the computation decomposition module 205 breaks each process into its primitive or basic building blocks (e.g., primitive computation closures) or the sub-processes of the whole execution. For example the audio filtering execution may be decomposed into computations or processes that support tasks such as, searching for available filtering tools, check the compatibility of audio file with the tools found, select the tool, activate the selected tool, etc. Each of the decomposed sub-processes may have certain specifications and requirements to effect execution of the processes in an information space 115a-115j or computation space 111a-111i such as input and output medium and type, how parameters or results are to be passed to other processes, runtime environments, etc. In order for a process to be executed in a standalone fashion without being part of a larger process, a computation closure can be generated for the process. A computation closure includes the process and the specifications and requirements associated with the process that can be executed independently for subsequent aggregation.

In another embodiment, the computation binding module 207 utilizes the defined closures by the computation decomposition module 205 and binds closures to their respective sub-processes in the computational graph produced by the computational graph constructor 203. The binding process enriches the computation closures with additional information such as the workload and needed resources which may not be originally included in the computation closures but exist in the initial computational graph.

In one embodiment, the computation refining module 209 optimizes the decomposed and bound computation closures, for example, by removing redundancies and verifying logical dependencies among individual standalone computations, their soundness and completeness, etc. The computation refining module 209 may store the computation closures in the storage 215. The stored closures can be used as sliced computations into smaller independent processes to be executed by various available UEs 107a-107i, computation spaces 111a-111i, or a combination thereof, using the data which may be stored on the distributed information spaces 115a-115j.

In another embodiment the local storage 215 is used for storing cached computation closures from a remote server, wherein a remote server may be any type of backend device having connectivity to the biometric information processing infrastructure 103 via the smart spaces 113a-113n and the communication network 105. The remote server may also be another device such as a UE 107a-107i. Additionally, the local storage 215 may contain local computation closures which may not be completely synchronized with the rest of the devices and utilized only locally. As described previously, access to the remote server or other component of the smart spaces 113a-113n may be determined based on the biometric information provided as input.

In one embodiment, the computation closures may be generated and stored using Resource Description Framework (RDF) format. RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 shows an example RDF graph structure.

TABLE 1

| Subject | Predicate | Object |
|---|---|---|
| uri://....../rule#CD-introduction, | rdf:type, | uri://............/Rule |
| uri://....../rule#CD-introduction, | uri://....../rule#assumption, | "c" |

The granularity may be achieved by the basic format of operation (e.g. RDF) within the specific computation environment. Furthermore, the reflectivity of processes (i.e. the capability of processes to provide a representation of their own behavior to be used for inspection and/or adaptation) may be achieved by encoding the behavior of the computation in RDF format. Additionally, the context may be assumed to be partly predetermined and stored as RDF in the information space and partly be extracted from the execution environment. It is noted that the RDF structures can be seen as subgraphs, RDF molecules (i.e., the building block of RDF graphs) or named graphs in the semantic information broker (SIB) of information spaces.

In certain embodiments generated closures associated with a certain execution context may be freely distributed by the computation distributor 211 among multiple UEs 107 and/or devices including remote processors associated with the UEs 107 by one or more user information spaces 113a-113n via the communication network 105. The processes of closure assigning and migration to run-time environments may be performed automatically based on factors such as the required processing power for each process, system load, capabilities of the available run-time environments, access rights (e.g., determined based, at least in part, on the biometric information), etc. Following the migration of each computation closure to its designated run-time environment, the run-time environment may communicate with the biometric information processing infrastructure 103 regarding the receipt of the closures through components referred to as agents. Upon receiving the communication from an agent, the biometric information processing infrastructure 103 verifies the consistency of the closures which, as explained before, are in RDF graph format. The consistency verification ensures that the computation closure content for each closure is accurate, contains all the necessary information for execution, the flow of data and instructions is correct according to the original computation and has not been damaged during the serialization and migration process. If the closures pass the consistency check or is otherwise approved, the computation aggregator 213 reconstructs each component of the execution context based on the content of the computation closures. Once an execution context is reconstructed, the agents of the run-time environment can resume the execution of the execution context component that it initially received as computation closures in RDF format. In one embodiment, the resumption of the execution may be combined with one or more other results of other executions of at least a portion of the execution context.

Figure 3:
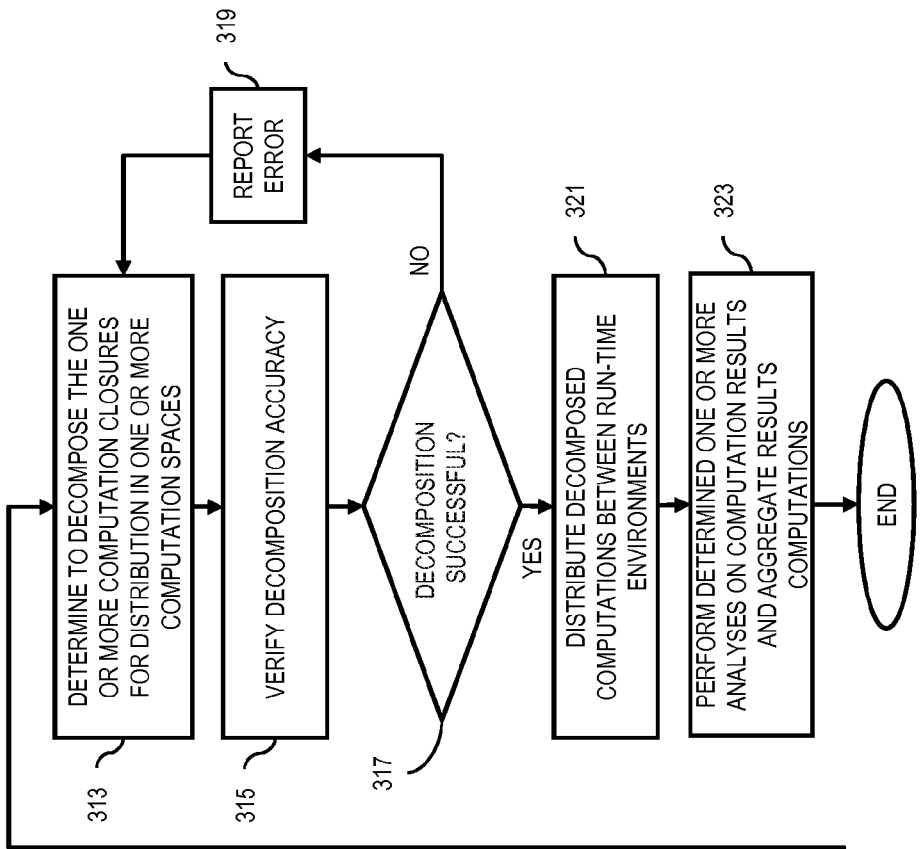
FIG. 3 is a flowchart of a process for providing biometric information processing using distributed computation, according to one embodiment.
Figure 3:
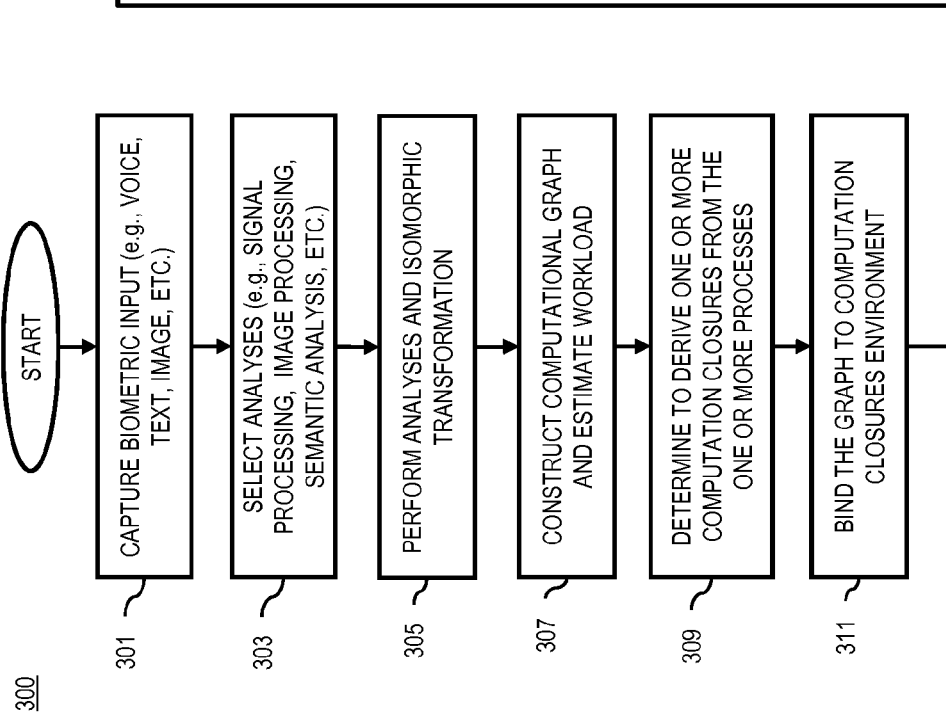
Figure 13:
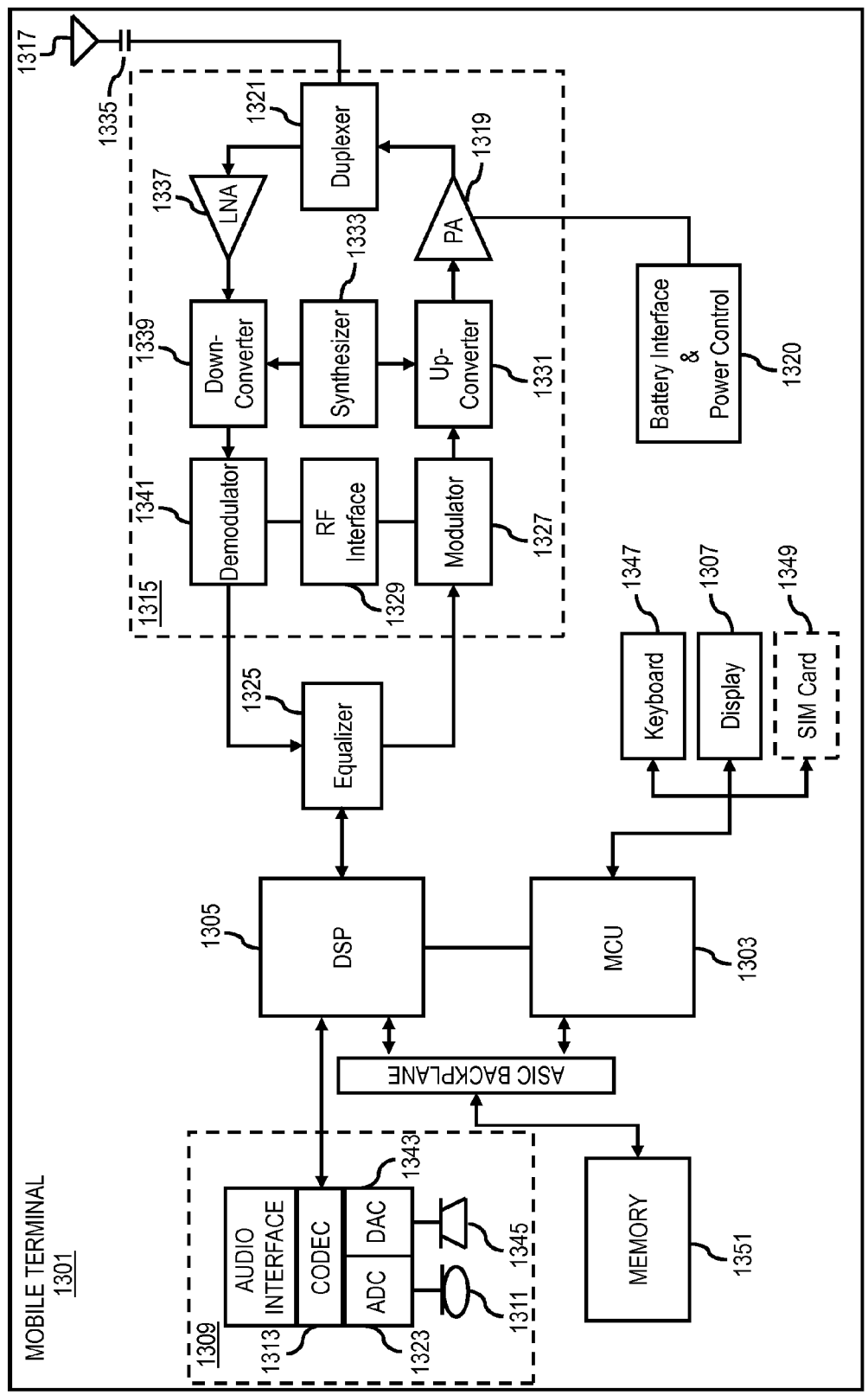
FIG. 13 is a diagram of a mobile terminal (e.g., handset) that can be used to implement an embodiment of the invention.

FIG. 3 is a flowchart of a process for providing biometric information processing using distributed computation, according to one embodiment. In one embodiment, the biometric information processing infrastructure 103 performs the process 300 and is implemented in, for instance, a chip set including a processor and a memory as shown in FIG. 13. In step 301, the biometric information processing infrastructure 103 receives a biometric information input (e.g., a natural language input or voice input for recognition) for processing. In one embodiment, the biometric input is a recording of human speech for processing. It is also contemplated that the input may be any other form of biometric information including images (e.g., for facial or object recognition), text (e.g., for behavioral biometric analysis), sound (e.g. voice), or any combination thereof. The input may also include information specifying one or more computations to be performed on the input. For example, the computations may be related to text to voice conversion, voice to text conversion, grammar verification, image to text conversion, fingerprint recognition, or any other biometric information processing. The input may be generated by the user of the UE 107a-107i or obtained from other sources such as the Internet. In step 303, the analysis module 201 selects one or more analyses for analyzing the input. The analysis may be selected from a list of analyses either available in the UE 107a-107i, or accessible from the smart space 113a-113n or other resources that the UE 107a-107i has connectivity to via the communication network 105, or a combination thereof. Per step 305, the analysis module 201 performs the one or more selected analyses on the input. The analyses may include signal processing (for example for filtration purposes), semantic analysis (for example for relating syntactic structures to parts of a text), pitch analysis (for example for voice recognition), etc. The analysis may also include isomorphic transformations (utilized, for example, as a basis for textual entailment recognition). Isomorphic transformation includes generating a one to one correspondence between the elements of two sets such that the result of an operation on elements of one set corresponds to the result of the analogous operation on their images in the other set. The isomorphic transformation may be utilized for textual analysis for grammatical structures, for verifying identical elements in voice recognition, for verifying the semantic similarity or difference among a recorded voice and the text generated based on the voice, for verifying differences and similarities between two fingerprints or other biometric markers or information.

In one embodiment, per step 307, the computational graph constructor 203 generates a computational graph for the requested computations to be applied on the input. The computational graph may represent processes, objects to be processed, relationship among processes and/or objects, etc. associated with requested computations. The computational graph may also include estimated workload for each sub-process to be considered for distribution of sub-processes among run-time environments.

Per step 309, the computation decomposition module 205 generates computation closures for each of the sub-processes in the computational and stores the closures in the database 215. The stored closures may be used for slicing computations into smaller independent processes to be executed by various available run-time environments, using the data which may be stored on the distributed information spaces 115a-115j.

In one embodiment, per step 311, the computation binding module 207 creates mapping between the original computational graphs and their respective computation closure environments. The mapping enables preserving information about original relationships among processes. The links that may be lost by process decomposition and distribution can be repaired and reconstructed during result aggregation by utilizing the mapping provided by the computation binding module 207, as a blueprint.

Per step 313, the computation decomposition module 205 divides the computations associated with the input into sub-processes based on the computation closures that are now bound to the computational graph. In step 315, the computation refining module 209 verifies the accuracy of the decomposed processes. The accuracy verification may include checking logical dependencies and relations among sub-processes, process consistency, isomorphic dependency between decomposed sub-processes and the original computation, etc. If the accuracy is not approved, the process may be repeated from step 313. In one embodiment, the computation refining module 209 may report the error to the computation decomposition module 205 per step 319 and request correction. In one embodiment, upon receiving the alert, the computation decomposition module 203 may investigate the reason for occurrence of the error. Once the reason is detected, the computation decomposition module 205 may take action for resolving the issue, for example by restarting the whole process of computation decomposition of step 313. In one embodiment, each module of the biometric information processing infrastructure 103 may verify its own previous results for accuracy.

In an example embodiment, such as in an instance in which the semantic analysis input is a natural language input, the process may also include estimating an outcome of the semantic analysis and binding the respective one or more computation closures with the estimated outcome to generate corresponding one or more estimated computation closures.

In one embodiment, the computation decomposition module 205 may determine that at least one portion of one or more of the computation closures, which are estimations of their corresponding sub-processes, have not been decomposed. In this case the computation refining module 209 may refine the computation closures so that the un-decomposed portions can be decomposed during the next decomposition process of step 313. In another embodiment, a separate module may be added for troubleshooting.

If the accuracy or acceptability of the decomposition is approved, per step 321, the computation distributor 211 distributes the independent computation closures among the run-time environments available in the computation space. The processes of closure assigning and distribution to run-time environments may be performed based on factors such as the required processing power and work load for each process estimated in step 307, system load, capabilities of the available run-time environments, etc.

In step 323, the computation aggregator 213 aggregates the primitive closures and utilizes the related requirements and information such as respective process starts to reconstruct the original computation or a portion of the computation. This is because the computation may have been decomposed into several parts in step 313, and each decomposed part may have been migrated into a set of one or more computation closures. Therefore, each set of computation closures may have been migrated to and executed by a different run-time environment. In one embodiment, the migration and execution of the one or more processes, the one or more computation closures, one or more corresponding information sets (e.g., information on which the closures, processes, etc. operate), or a combination thereof is based, at least in part, on the biometric information provided in the input. As described above, the biometric information can be used to identify access rights to specific computation resources (e.g., closures, processes, network nodes, smart spaces, etc.) that are used in the distributing the closures of the execution context. The execution of aggregated closures may then be resumed by the agents of each run-time environment. In one embodiment, prior to the computation aggregation, the analysis module 201 may analyze the decomposed processes using the available analyses to ensure compliance of decomposed processes to the original input with regards to the analyses.

In one embodiment, the computation aggregator 213 may bind the computation results to one or more elements of UI 109a-109i to enable a user to access the results. For example in the example of voice to text conversion, the produced text may be stored on any storage media within the smart space environment and an icon or message on the UI inform the user that the result is ready to be viewed.

Figure 4A:
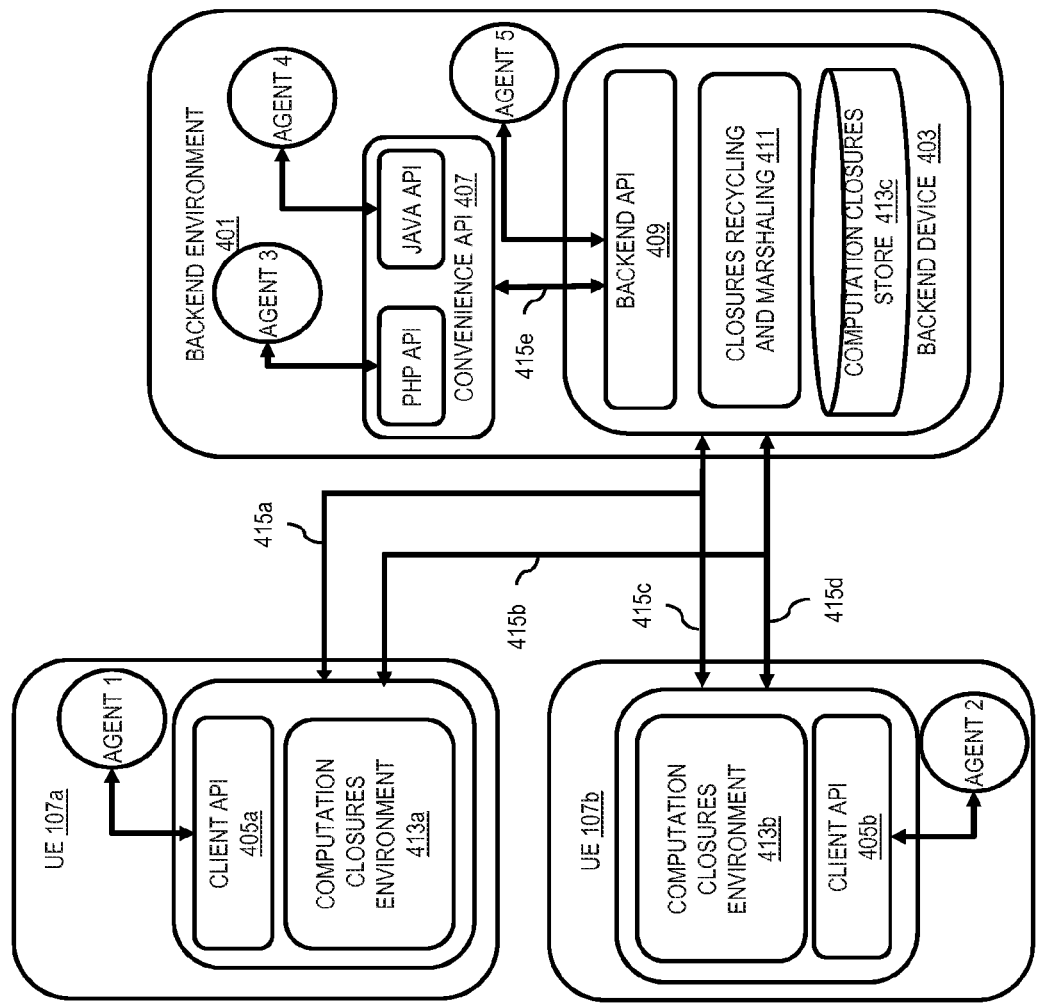
FIGS. 4A-4B are diagrams of computation closures recycling among devices, according to one embodiment.
Figure 4B:
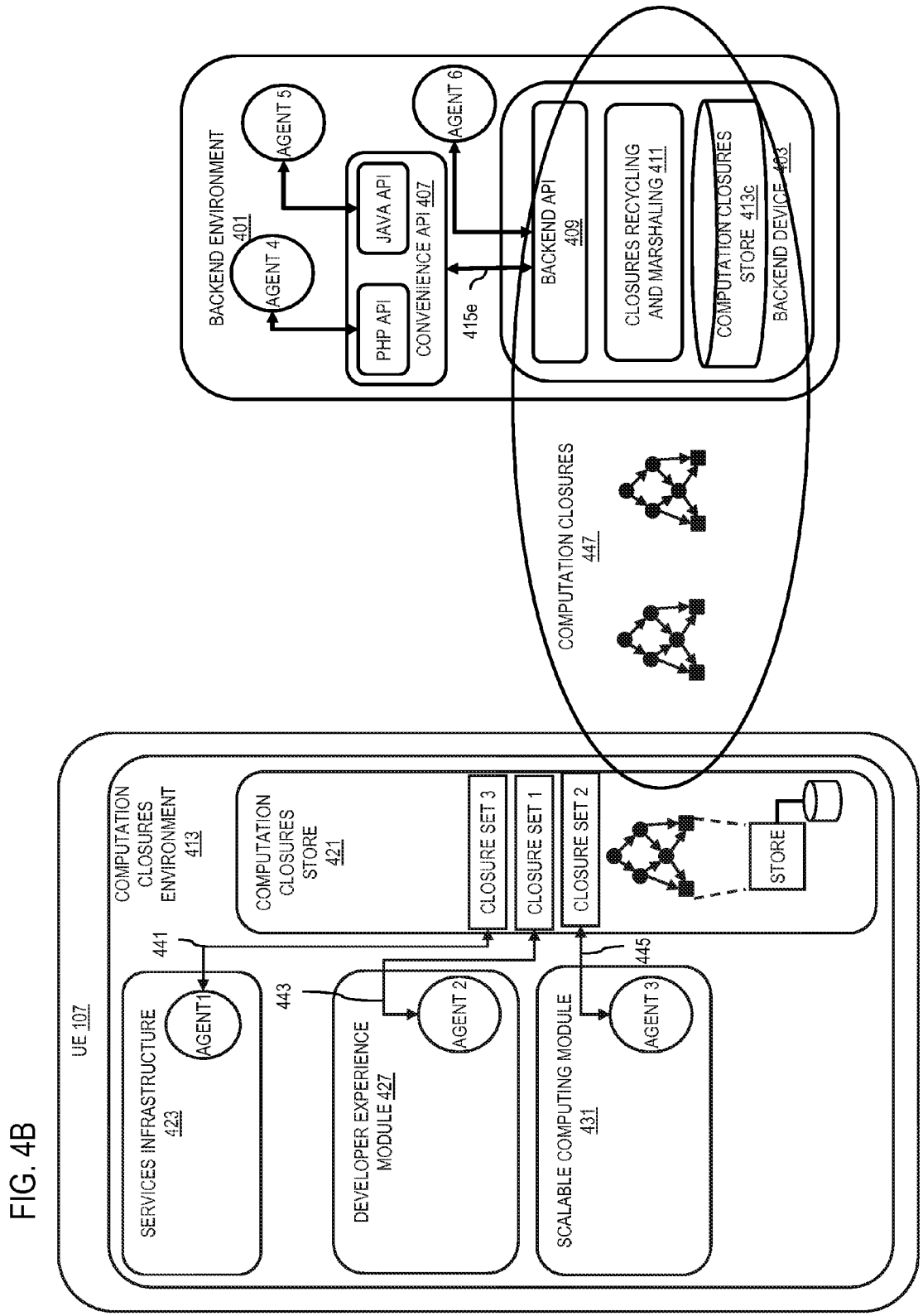

FIGS. 4A-4B are diagrams of computation closures recycling among devices, according to one embodiment. In one embodiment, in FIG. 4A, the backend environment 401 may be a virtual run-time environment within the user's smart spaces 113a-113n or on one UE 107 associated with the user. The backend environment 401 may include one or more backend devices 403 and one or more Application Programming Interface (API) such as a convenience API 407 that may include APIs tailored to the software development environments used (e.g. JAVA, PHP, etc.). Each API enables interaction between devices and components within the backend environment 401. In one embodiment, access to any component of the backend environment 401 is based on biometric information provided as input to the system 100. For example, backend API 409 enables interaction between the backend device 403 and Agent5, and convenience API 407 enables interaction between the backend device 403 and agents Agent3 and Agent4, wherein each agent is a set of processes that handle computation closures within the backend environment 401. As seen in the example of FIG. 4 Agent3 works under PHP while Agent4 is a JAVA process. Each of the UEs 107a and 107b has a computation closure environment 413a and 413b which are part of a computation space 111a-111i. Arrows 415a-415e represent distribution of computation closures among the environments 413a, 413b and the computation closure store 413c. The computation closures store 413c is a repository of computation closures that can be accessed and used by all the UEs 107a-107i having connectivity to the backend environment 401.

In one embodiment, the backend device 403 may be equipped with a closure recycling and marshaling component 411 that monitors and manages any access to the computation closure store 413. By way of example, access to the computation closure store 413 may be authenticated based on the biometric information (e.g., user identity associated with the biometric information). In other embodiments the closure recycling and marshaling (i.e. standardization for uniform use) may be a function of the biometric information processing infrastructure 103.

In one embodiment, the computation closures within environments 413a, 413b and the computation closures store 413c may be composed based on anonymous function objects and automatically created by a compiling system using methods for generating anonymous function objects such as lambda expressions.

FIG. 4B is an expanded view of a computation closure environment 413 as introduced in FIG. 4A. The computation closure environment 413 may be composed of one or more computation closure generating components. In one embodiment the computation closure environment 413 has a services infrastructure 423 that provides various services for the user of the UE 107. The services may include any application that can be performed on the UE 107 such as, voice to text or text to voice conversion, grammar checking, games, music, text messaging, voice calls, user authentication services, etc. In one embodiment, the service infrastructure 423 provides support for closure based granular reflective processes under the supervision of a biometric information processing infrastructure 103 as discussed in FIG. 1. The agent Agent1 retrieves the computation closures required by the services infrastructure 423 from the computation closures store 421 and stores the newly generated computation closures by the services infrastructure 423 into the computation closures store 421 for recycling purposes per arrow 441.

In another embodiment, the computation closure environment 413 has a developer experience module 427 that provides various tools for a developer for manipulating services offered by the UE 107. The tools may include standardized and/or abstract data types and services allowing the developers to chain processes together across development platforms.

In one embodiment, the developer experience module 427 provides cross platform support for abstract data types and services under the supervision of a biometric information processing infrastructure 103 as discussed in FIG. 1. The agent Agent2 retrieves the computation closures required by the developer experience module 427 from the computation closures store 421 and stores the newly generated computation closures by the developer experience module 427 into the computation closures store 421 for recycling purposes per arrow 443.

In yet another embodiment, the computation closure environment 413 has a scalable computing module 431 that provides an abstract wrapper (i.e. monadic wrapper) for the execution context 117*a*-117*m*. This abstraction provides computation compatibility between the execution context 117*a*-117*m* and the UE 107*a*-107*i*. The abstract wrapper may provide scheduling, memory management, system calls and other services for various processes associated with the execution context 117*a*-117*m*. These services are provided under the supervision of the biometric information processing infrastructure 103 as discussed in FIG. 1. In certain embodiments, the availability of one or more of the services or individual functions of the services are based on access rights determined based, at least in part, on the biometric information. The agent Agent3 retrieves the computation closures required by the scalable computing module 431 from the computation closures store 421 and stores the newly generated computation closures by the scalable computing module 431 into the computation closures store 421 for recycling purposes per arrow 445. In one embodiment, the backend environment 401 may access the computation closure store 421 and exchange one or more computer closures 447 between the computation closures store 421 and the backend computation closures store 413*c*.

Figure 5A:
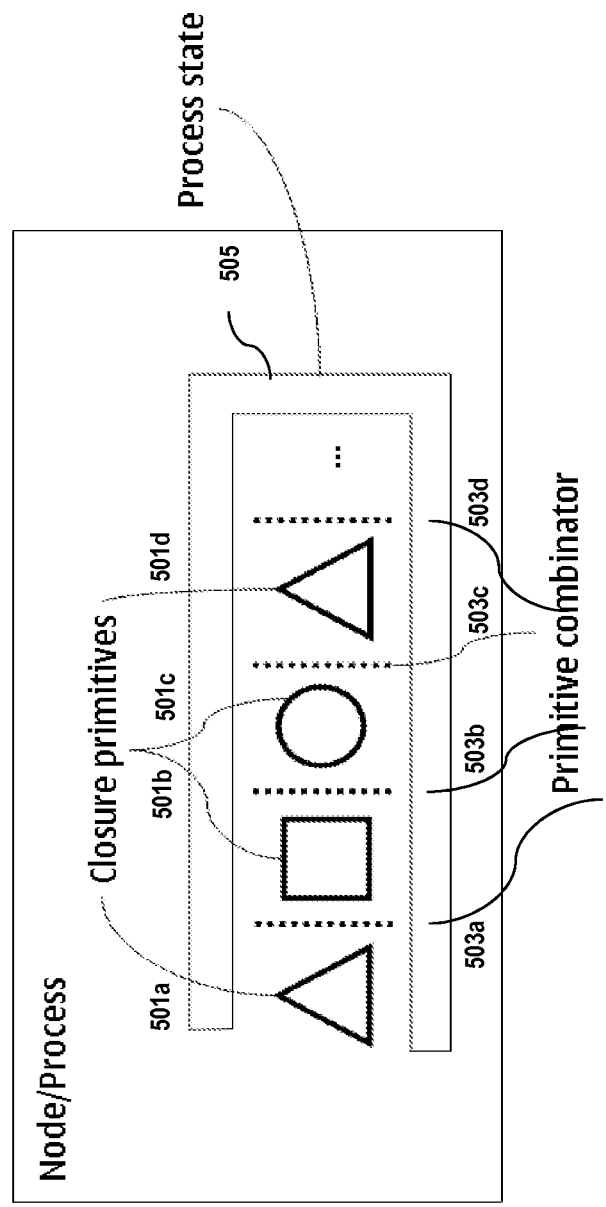
FIGS. 5A-5C are diagrams of computation distribution, according to various embodiments.
Figure 5B:
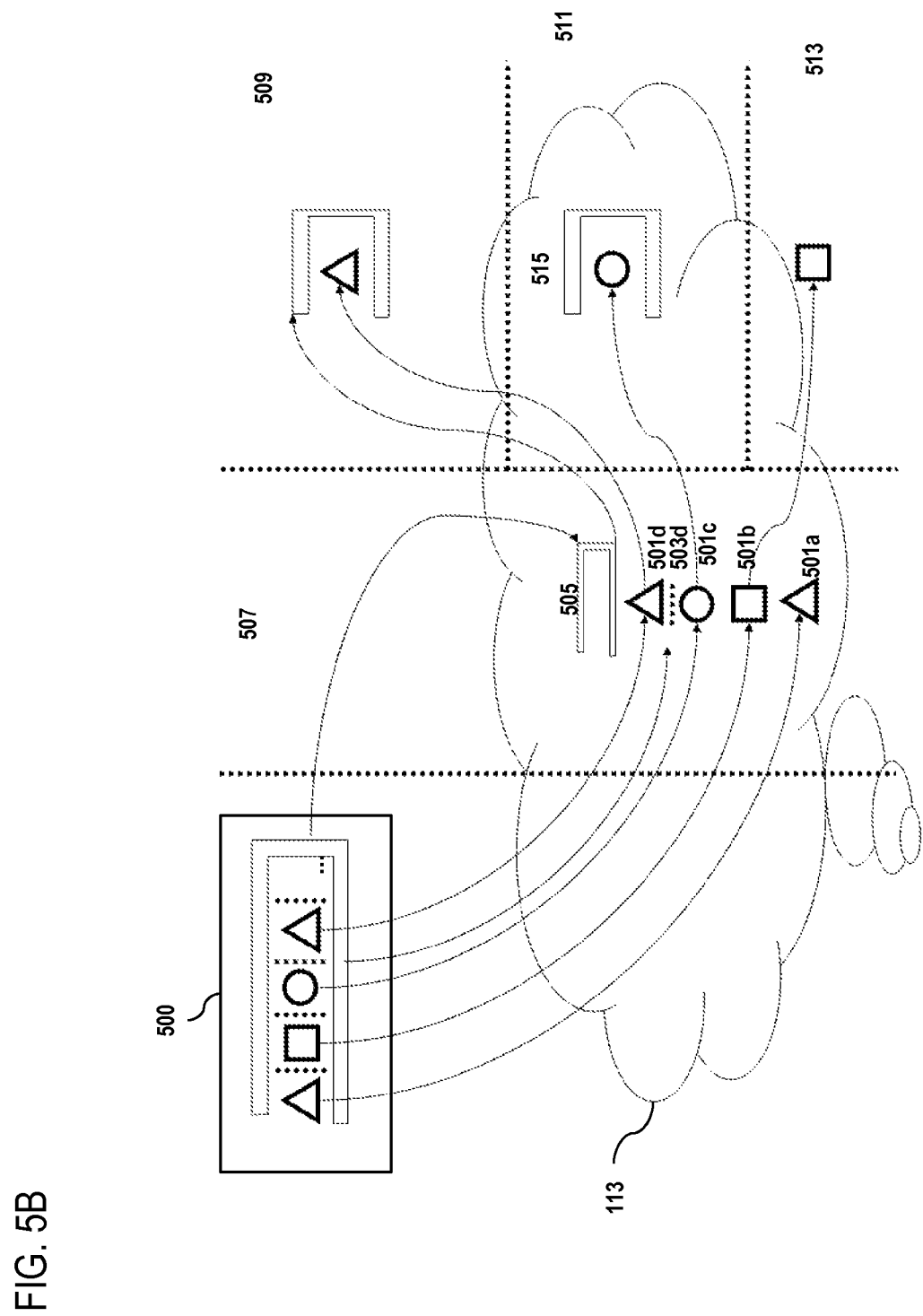
Figure 5C:
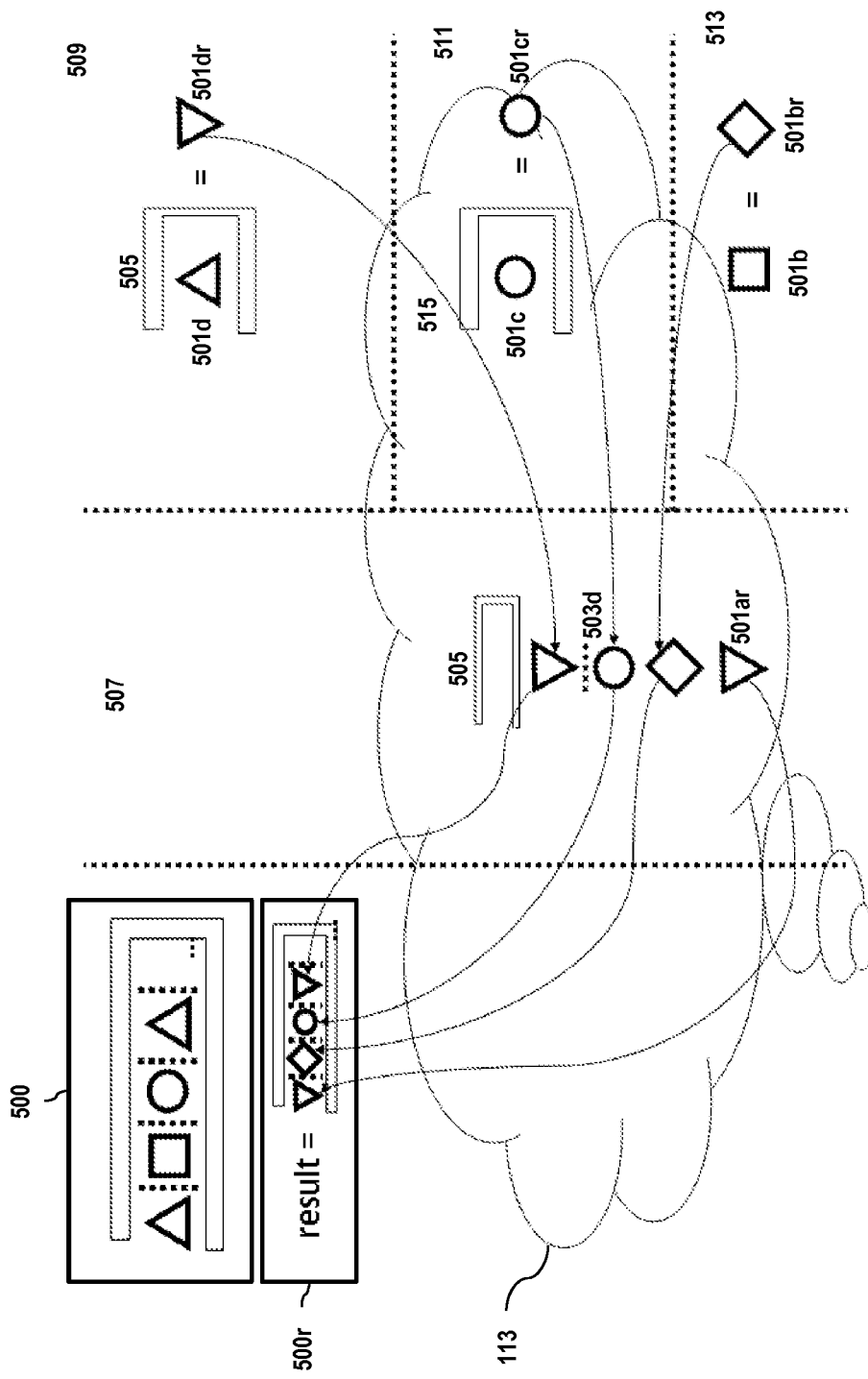

FIGS. 5A-5C are diagrams of computation distribution, according to various embodiments. FIG. 5A shows a process as a combination of primitive closures. Process 500 consists of closure primitives 501*a*-501*d*. The closure primitives 501*a*-501*d* are combined with each other into process 500 by combinators 503*a*-503*d*. The object 505 represents the execution requirements including process states under which the execution of closures 501*a*-501*d* combined by 503*a*-503*d* will result in the process 500.

FIG. 5B shows the decomposition of process 500. During the decomposition, closures 501*a*-501*d*, combinators 503*a*-503*d* (only 503*a* shown) and the process states 505 are migrated as independent components into, for instance, a virtual run-time environment 507 included in a smart space 113*a*-113*n* associated with process 500. The independent closures 501*a*-501*d* from run-time environment 507 may be distributed into different run-time environments 509, 511 and 513 where they may be executed. As seen in FIG. 5B, the closure 501*d* and the process states 505 have been distributed to the run-time environment 509, the closure 501*c* has been distributed into the run-time environment 511 where a process states 515 already exists. The execution of closure 501*c* in environment 511 under the process states 515 may lead to accurate results only if the process states 515 include the process states 505. The verification as to whether process states 515 can be considered as an equivalent of process states 505 is determined by the computation decomposition module 205 or a component associated with the computation decomposition module 205 (not shown). Furthermore, the closure 501*b* has been distributed to the run-time environment 513 where the process states do not exist. Similarly, in this case the computation decomposition module 205 or a component associated with the computation decomposition module 205 may check and verify a correct closure distribution.

It is noted that the standalone property of computation closures shows that the closures are transitive, meaning that the results of execution of one or more processes from a closure will also be a member of the closure.

FIG. 5C shows the aggregation of the independent closures distributed in FIG. 5C into the result 500*r* of process 500. As seen in FIG. 5C, in the virtual runtime environment 509 the closure 501*d* is combined with the process states 505 and the result closure 501*dr* is produced. Similarly process 501C is combined with the process states 515 in the run-time environment 511 and the result 501*cr* is produced. In environment 513 the closure 501*b* may be transformed utilizing the existing process states in the environment and the result is closure 501*br*. The closure 501*a* (from FIG. 5B) has been combined with the process states 505 in the run-time environment 507 and the result 501*ar* has been produced. The resulted closures are being sent back to the run-time environment 507 where the computation aggregator 213 aggregates all the resulted closures into a process 500*r* which is an equivalent of process 500. Resulting process 500*r* may be executed by another UE or by any other processors associated with the user of the initial UE (where process 500 initiated) via the smart space 113*a*-113*n*.

Figure 6:
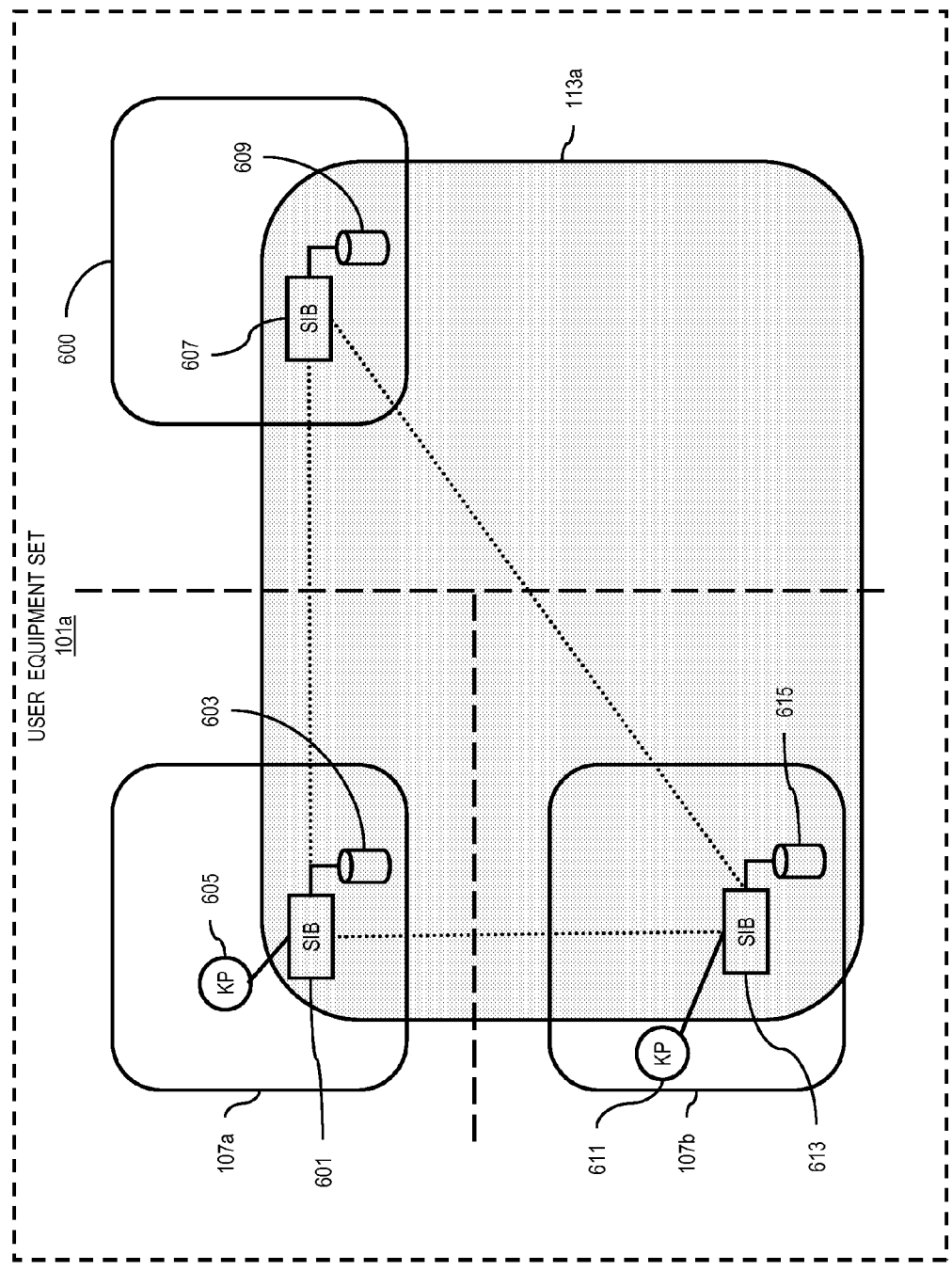
FIG. 6 is a diagram of user equipment set, according to one embodiment.

FIG. 6 is a diagram of user equipment set, according to one embodiment. As seen in FIG. 6 the user equipment set 101*a* consists of UEs 107*a* and 107*b* and another device 600 which may not be a user equipment, but a part of the smart space set 113*a* for the user. The device 600 may for example be part of a server environment. The user may own a smart space set 113*a* which is distributed between devices 107*a*, 107*b* and 600. In some embodiments, access to the user-owned smart space set 113*a* is determined based, at least in part, on the biometric information provided by the user. The smart space set 113*a* includes Semantic Information Brokers (SIB) 601 in UE 107*a*, the SIB 607 in device 600 and the SIB 613 in UE 107*b*. Additionally, each smart space in set 113*a* has knowledge processors (KPs) 605 in UE 107*a* and 611 in UE 107*b*. Furthermore, the information space may utilize storage components 603, 609 and 615 of the devices involved in the information space. The SIBs of information space set 115*a*-115*j* may communicate with each other (shown with dotted lines). Assuming that UEs 107*a* and 107*b* are located in a close proximity from each other (e.g. in an office) the user may desire to transmit processes that were initiated on one of the UEs to the other. For example, the user may start playing an online video on UE 107*a*, and realizing that the UE 107*a* does not have sufficient processing power or storage space for downloading and playing the video. The user may grab the element on the UI of the UE 107*a* representing the video and push it towards UE 107*b*. The user gesture may activate the migration process from UE 107*a* to UE 107*b* under supervision of the biometric information processing infrastructure 103, and as a result the video is downloaded and played on UE 107*b*, while user is able to utilize UE 107*a* for other purposes (e.g. making phone calls, text messaging, etc.). The decomposition and aggregation of the sub-processes is done respectively by the computation decomposition module 205 and the computation aggregator 213 and the execution of migrated processes is performed by KP 611 under the supervision of the biometric information processing infrastructure 103. Following the completion of the execution, the biometric information processing infrastructure 103 may update the context of UE 107*a* to the state as if the video was played by UE 107*a*. Furthermore, the context of UE 107*b* may be reset to the state prior to process migration, meaning that processes that may have been halted for the execution of the migrated processes can be resumed.

Figure 7:
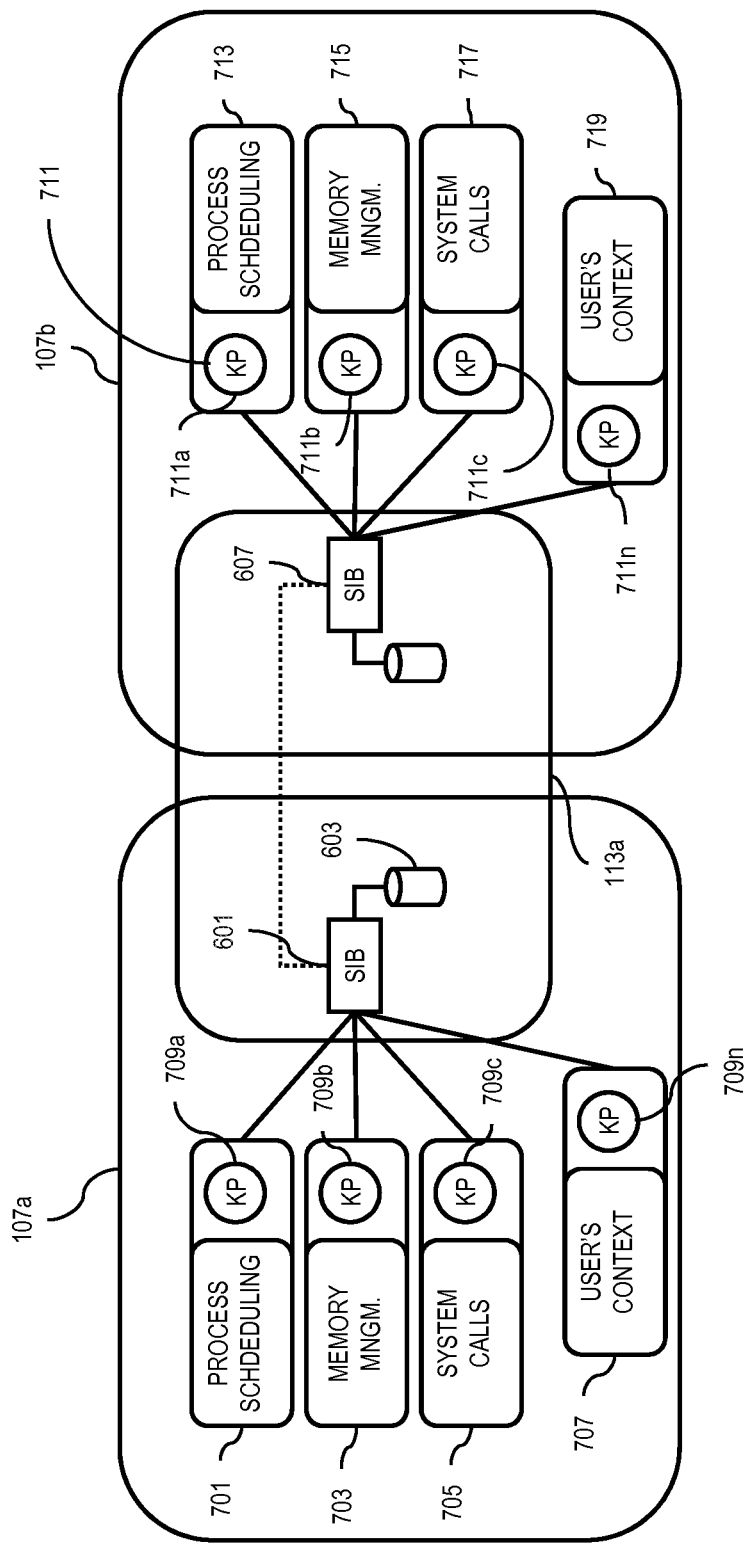
FIG. 7 is a diagram of process migration, according to one embodiment.

FIG. 7 is a diagram of process migration, according to one embodiment. Typically, during an information processing lifecycle, one or more execution contexts that may be represented in RDF form based on sub-graphs are stored by a SIB 601 of an information space 115a. The user context and execution context may result from execution of a program code of an application by a knowledge processor KP 709a-709n and stored in memory 703 of UE 107a which is utilized by SIB 601. If a KP 709a-709n of UE 107a detects that the UE 107b is attempting to communicate with UE 107a over a communications medium, UE 107a can share the user and execution contexts over a communications connection in the communications medium with UE 107b for continued or enhanced execution of an application by a KP 711a-711n in UE 107b. Following the completion of the process on UE 107b, the UE 107a may receive an alert from the SIB 601 indicating closing of the communication connection with (for example stationary wireless) UE 107b. In this case, UE 107a may receive updated user and execution contexts from the UE 107b over the communications connection so that the UE 107a can continue the execution of the application on a KP 709a-709n.

It is noted that a communications medium can be physical or logical/virtual, but all managed by the biometric information processing infrastructure 103 as virtual run-time environment high-context information (information processing context is seen as snapshot in the form of sub-graph). The sharing of the user and execution contexts and reflective process execution of the application on KP 711a-711n of UE 107b is managed by the biometric information processing infrastructure 103. The biometric information processing infrastructure 103 shares and provides reasoning about user and execution contexts between UE 107a and UE 107b with SIBs 601 and 607. For example UE 107a may be a mobile wireless device and UE 107b may be a stationary wireless device.

The biometric information processing infrastructure 103 enables decomposition and aggregation of user and execution context information and scheduling of the run-time environment. This enables changes to be made to one or more user contexts 707 and 719 and execution contexts (not shown). Changes to user and execution contexts may include starting, executing, scheduling, dispersing, and aggregating of information within the environment of the information space set 115a processes or tasks wrapped through KPs 709a-709n and 711a-711n or other KPs functionalities such as process scheduling 701 and 713, memory management 703 and 715, system calls 705 and 717, etc.

KPs 709a-709n and 711a-711n and their corresponding information in the form of RDF sub-graph dispersion and aggregation may be performed by selective recycling apparatus of the information space set 115a and/or the distribution. Selective recycling may be performed by the closure recycling and marshaling 411 driven by a recovery-conscious scheduler that may be part of the information space environment scheduler and supported by information provided by the computing environment processes/tasks scheduler 701 and 713. The user contexts 707 and 719 and the execution contexts (not shown) may be dynamically assigned and triggered and allocated according to a particular or operating system task management. It is noted that the terms KP and relevant information within SIB, represented as RDF sub-graph sets are abstract enough to be presented through other procedural aspects of the computing environment (e.g. a higher abstraction level).

In one embodiment, following the receipt of one or more user contexts 707 and 719 and additional execution contexts by UE 107b from UE 107a, and other relevant information over a communications medium, the UE 107b executes or shares the reflective state of the application by a KP 711a-711n. Upon completion of the process, the UE 107b may determine the information shared with SIB 607 through corresponding KP 711a-711n. This determination may result in closing a secure communication link with UE 107a. Prior to closing the communication connection, the UE 107b may share one or more user and execution contexts with UE 107a over the communications medium for continued execution of the application by KP 709a-709n in UE 107a. The sharing of the user and execution contexts and execution of the application on UE 107a is managed by the biometric information processing infrastructure 103. Such virtual run-time environment enables shared user and execution context sessions between UE 107a and UE 107b.

In another embodiment, prior to closing of the communication connection, the UE 107b may share an initial portion of the updated user and execution context with UE 107a over a initial communication connection and share the remaining portion of the updated user and execution contexts with UE 107a over the last communication connection for continued execution of the application on UE 107a. The adaptive computing platform described enables granular information processing context migration capability for a computing device to enhance the processing power of the devices within the information space environment.

Figure 8:
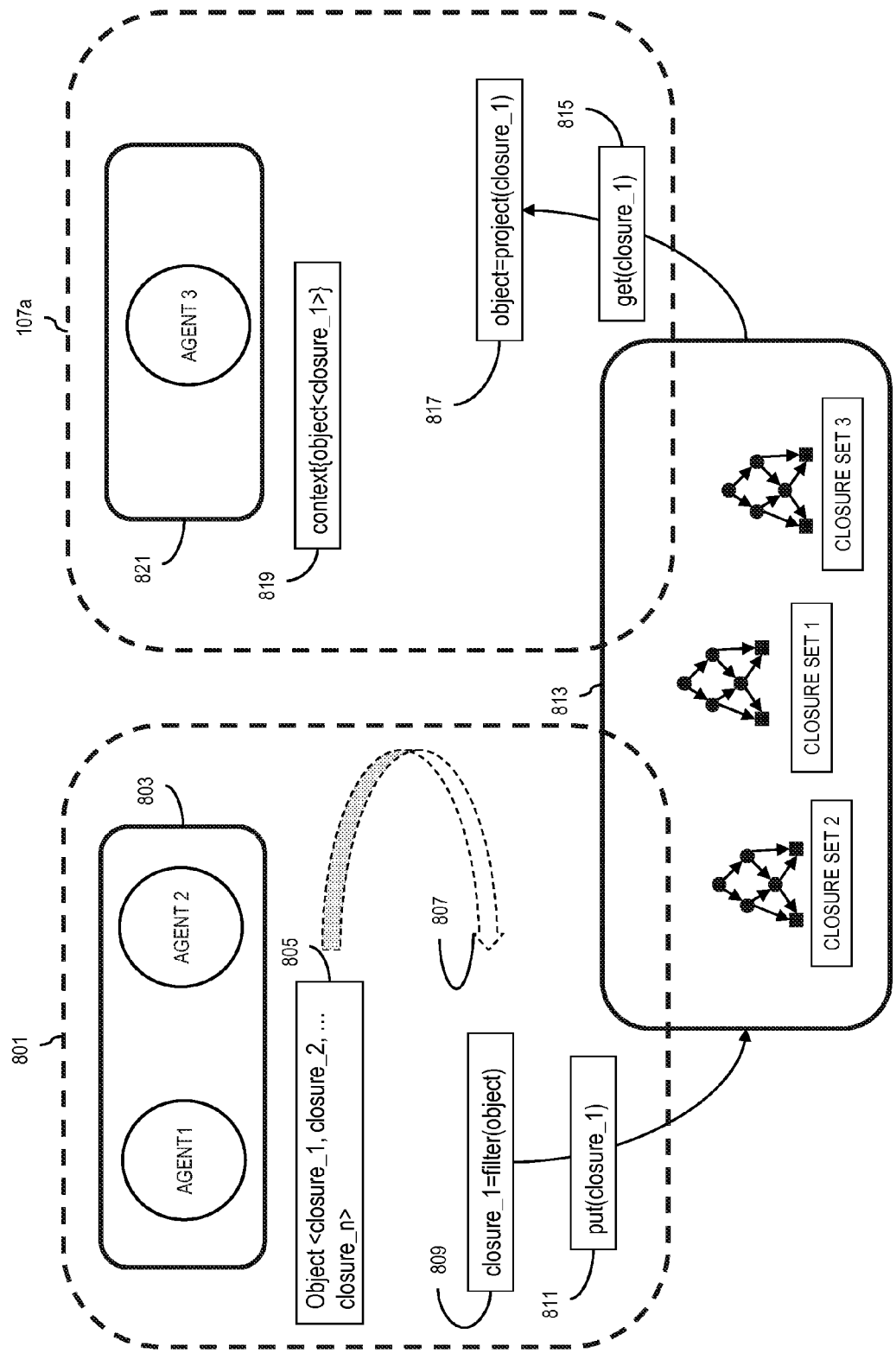
FIG. 8 is a diagram of process migration from a device to another device, according to one embodiment.

FIG. 8 is a diagram of process migration from a device to another device, according to one embodiment. In one embodiment, the backend device 801 may be a virtual run-time environment within the user's smart spaces 113a-113n or on one UE 107 associated with the user. The backend device 801 may include a user context 803 for every user equipment 107a-107i connected to the backend device 801. The user context 803 may be a copy of the user context 821 for each device 107a which is being migrated among devices. Agent1 and agent2 are processors that calculate and handle computation closures within the user context 803. The number of agents may be different in different devices based on their design, functionality, processing power, etc. Block 805 represents an Object as a set of computation closures, closure_1, closure_2, . . . , and closure_n, where each closure is a component of a larger process, for example, related to a service provided to the user by the user equipment 107a. The closures may be generated by the computation decomposition module 205 and each closure is a standalone process that can be executed independently from the other closures. In the example of FIG. 8, the filtering process 807 extracts closure_1 from the closure set Object via filtering the set (shown in block 809) by a component of the biometric information processing infrastructure 103 such as the analysis module 201. The extracted closure_1 is added to a computation closure store 813 using the exemplary Put command 811.

In this example, assuming that the extracted computation closure, closure_1 is supposed to be executed on the user equipment 107a, the user equipment 107a extracts the computation closure closure_1 from the computation closure store 813 using the Get command 815.

In one embodiment, the decision of the equipment on which a computation closure is executed, may be made by a user by pushing, or flicking specific icons of the user interface associated with a process on one user equipment towards another user equipment (e.g. 107a). In another embodiment, the equipment executing a computation closure may be automatically assigned or determined based on access rights indicated by the biometric information. The extracted closure_1 is projected into a closure with the user device context (process states) and the object 817 is produced. The block 819 represents the reconstruction of the closure into the initial context by a component of the biometric information processing infrastructure 103 such as the computation aggregator 213. The aggregated context may then be executed in the run-time environment 821 of UE 107b by Agent3.

In another embodiment, the block 801 may be a user equipment and block 107a a backend device or both blocks 801 and 107a may be UEs. In this embodiment the decomposition and aggregation processes are similar to the above example with the difference that closure_1 is extracted from a process on the UE 801.

Figure 9:
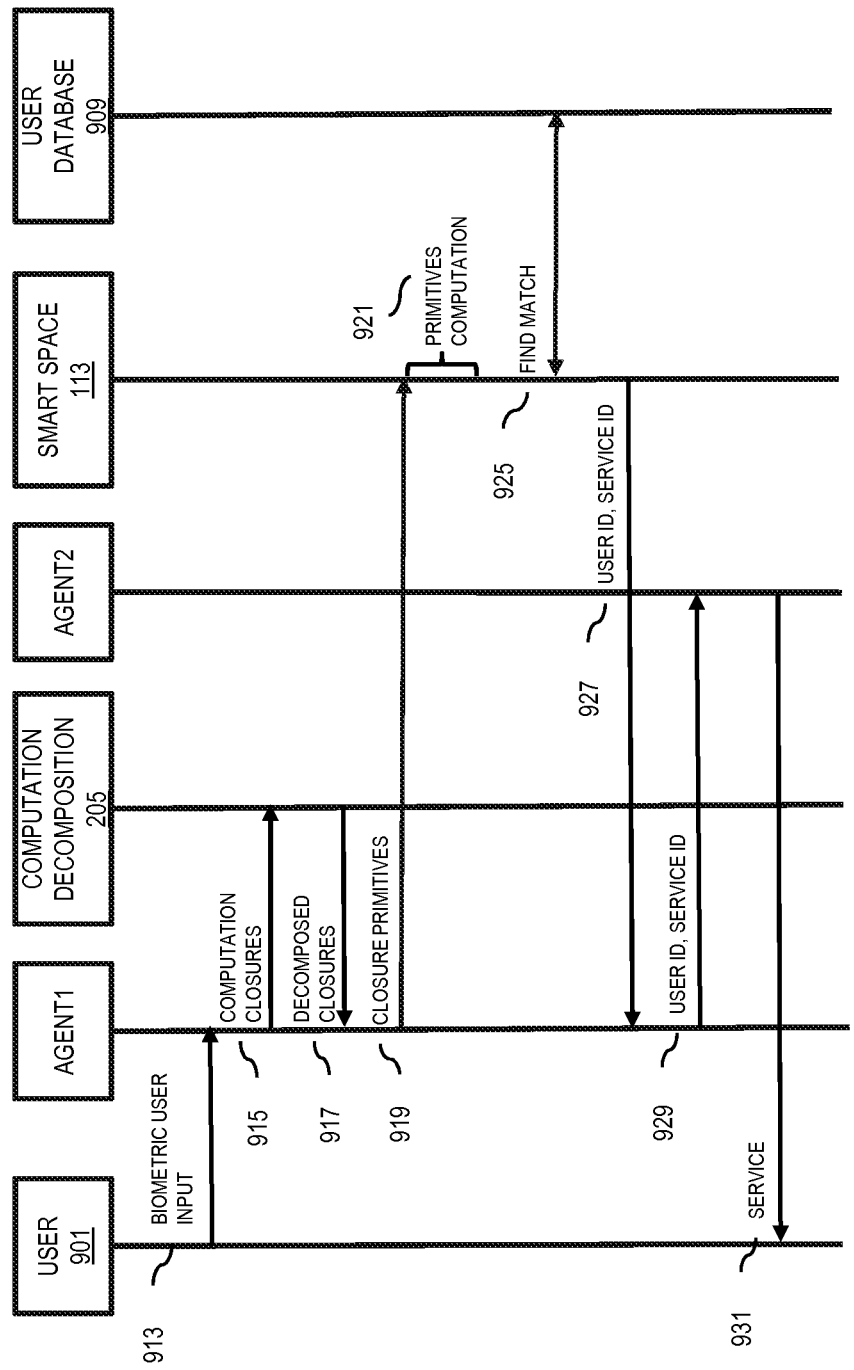
FIG. 9 is a diagram of user authentication based on biometric information, according to one embodiment.

FIG. 9 is a diagram of user authentication based on biometric information, according to one embodiment. In one embodiment, the biometric information processing infrastructure 103 may be used for authentication of one or more UEs 107a-107i and/or their corresponding users. User authentication is typically ensured through designation of one or more usernames and passwords to the user. Other common methods of user authentication include using tokens such as smart cards, RSA secure ID cards, etc.

User authentication based on biometric information, which involves methods for uniquely recognizing human users based upon one or more intrinsic physical or behavioral traits, provides significant improvement in device usability. However, user authentication based on biometric information typically requires considerable resources (e.g., processing, storage, and/or bandwidth resources) including additional hardware for measuring and processing the biometric identification information such as voice (e.g., natural language input), fingerprints, face appearance, etc.

Since mobile devices (e.g. phones, laptop computers, etc.) have the capability of recording and processing user's voice, user's fingerprint, computation of voice prints, as a biometric, can be used for user authentication purposes. User authentication can be very important in cases where users access sensitive information such as corporate information via their personal mobile devices. For example when a user tries to read corporate emails using a mobile device, the device may enforce a screen-lock, which can be opened by typing a PIN number. However, implementing such screen locks and forcing users to memorize extra PIN numbers is not a user friendly approach and can degrade the user experience. Additionally, even though using a PIN number provides better device usability than having usernames and/or passwords, such a PIN number approach is often based on the assumption that only a single user can open the screen-lock. In this type of application, using biometric information such as voice recognition may greatly improve device usability. Furthermore, using biometric information enables providing user friendly authentication for multiple users on the same device. However, reliable user recognition based on user's voice requires complex computations such as frequency estimation, hidden Markov models, Vector Quantization, decision trees, etc. Utilization of smart spaces allows the complex computations to be executed by processing units within the smart space environment which are not limited to the resources available directly on the UEs 107.

It is noted that utilization of biometric information, as referred to in this exemplary embodiment, is not limited to email applications. More generally, smart spaces 113a-113n can provide various user contexts to the agents in UEs 107a-107i or in any other devices that have connectivity to the UEs via the smart spaces 113a-113n.

In one embodiment, upon providing biometric information to the UE 107a-107i by a user, the complex computations that are required to verify user identity are executed in smart space 113a-113n in a distributed fashion as explained.

FIG. 9 describes a scenario where an unknown user is trying to use a service that can be accessed via Agent2, but requires user identification and authentication. In FIG. 9, the agents Agent1 and Agent2 are processing units as described in FIGS. 4A, 4B and FIG. 8. Per step 913, a user 901 sends a request for using a service provided by Agent2 wherein the request includes the user's biometric information (e.g. voice, fingerprint, etc.). For example the request may be a voice command "Open my emails". Upon receiving the input by Agent1, the computation decomposition module 205 of the biometric information processing infrastructure 103 decomposes the input into closure primitives per step 915. The decomposed closures are returned to Agent1 per step 917 and also saved in the smart space 113 PER STEP 919. The process of saving the computation closures in the smart space may be done by Agent1, other Agents in the UE (not shown), a component of the biometric information processing infrastructure 103, or a combination thereof. The computation decomposition module 205 may extract the biometric information (voice print, fingerprint, keystroke measurements, etc.) while decomposing the closures. Per step 921, the smart space 113 executes the computations or the closures, required for the recognition or identification of the user 901 through biometric information. The computation process may be performed by distributed runtime environments 509-513 as described in FIGS. 5B and 5C. Per step 925, the smart space 113 compares the results of the processed biometric information with the content of a user database 909 which contains biometric information of the authentic users. The comparison result is returned to Agent1 per step 927. If a match is found, per step 929, Agent1 sends user credentials to Agent2 where Agent2 can provide the requested service to the user 901, for example display the list of user emails. If a match for user 901 is not found in the database 909, the requested service to user 901 is denied. In some embodiments, this process enables a device to provide services to multiple users. For example, depending on the person who enters the voice command "Open my emails" the device can open the personal inbox for the owner of the voice and therefore the inbox for different users can be opened in the same device.

In various embodiments, computation distribution can be performed in different architectural configurations, such as from a back end device to a UE 107, from a UE 107 to a backend device, from a UE 107 to another UE 107, or a combination thereof depending on access rights to the configurations as determined by the biometric information.

Figure 10:
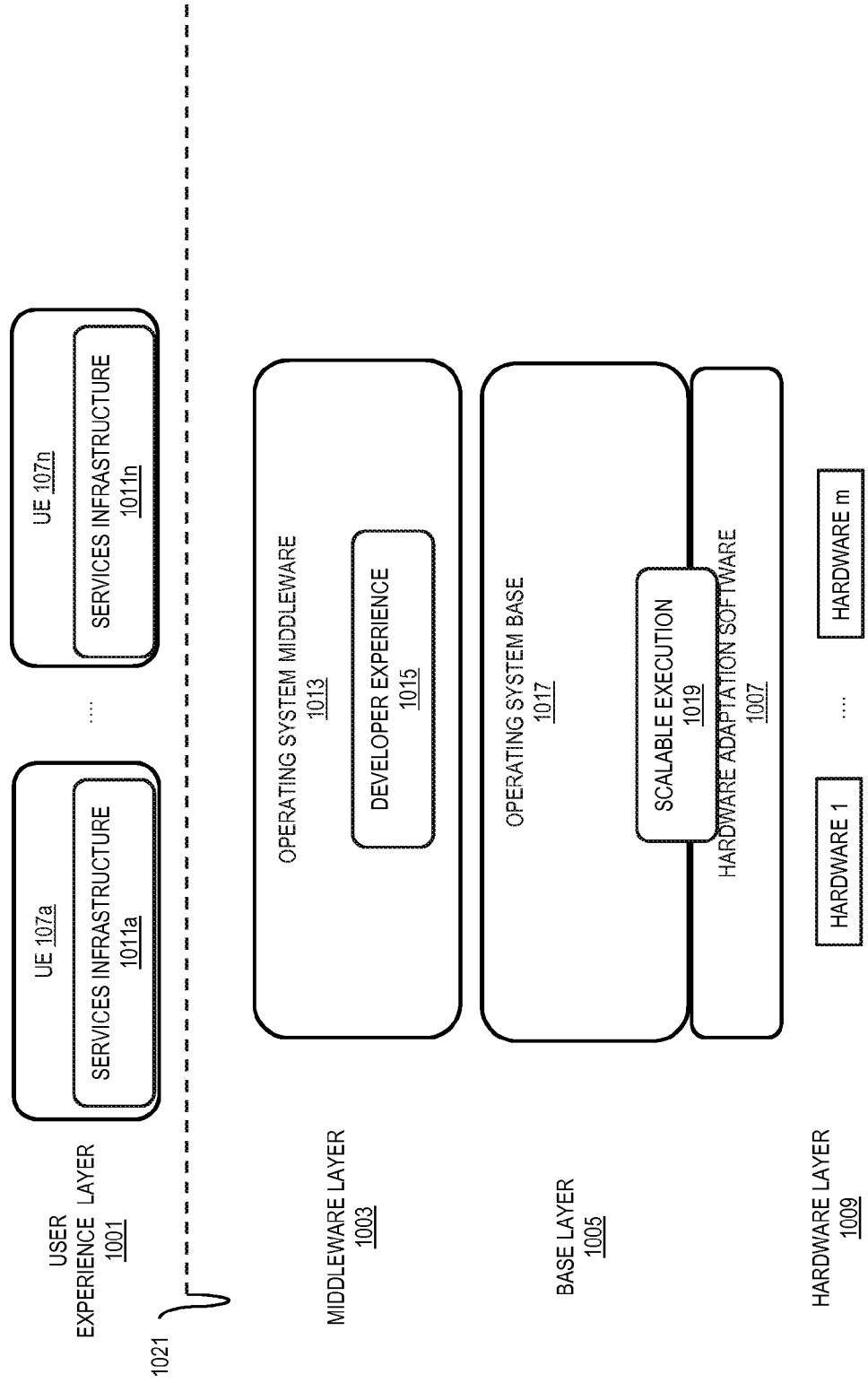
FIG. 10 is a diagram of alignment between layers of a system providing distributed computations, according to one embodiment.

FIG. 10 is a diagram of alignment between layers of a system providing distributed computations, according to one embodiment. The system of FIG. 10 comprises main layers such as a user experience layer 1001, a middleware layer 1003, a base layer 1005 and a hardware layer 1009. The user experience layer 1001 is the tangible layer of the system to the user. This layer may include the UEs 107a-107i wherein each UE may include a service infrastructure 1011a-1011n. The service infrastructure comprises the services that the UE provide to the user such as voice, data, audio, video, and parameters and setups associated with the provided services.

The dotted line 1021 separates the user environment from the system environment which is invisible to the user. The middleware layer 1003 may include the operating system (e.g. MeeGo®, Symbian®, etc.) middleware 1013 and the developer experience 1015. The operating system middleware 1013 may include components such as Application Programming Interfaces (APIs) which are independent from the hardware and the usage model of the operating system, various toolkits such as operating system's native toolkits or application toolkits, additional operating system utilities, etc. The developer experience 1015 includes the programs and scripts produced by the developers and installed on top of the operating system for tailoring the system services to the specific needs of UEs 107a-107i. The base layer 1005 includes the operating system base 1017 which may include kernel and core services of the operation system. The operating system base 1017 communicates with the hardware layer 1009 via hardware adaptation software 1007. The hardware adaptation software 1007 interprets the messages and commands communicated between the operating system base 1017 and the machine code associated with the hardware devices hardware1, to hardware m. Still, an additional scalable execution component 1019 may be utilized in order to scale the functions of the operating system base 1017 with the hardware adaptation software 1007. The scalable execution 1019 provides compatibility between the operating system base 1017 and the hardware adaptation software 1007. The functionalities associated with computation distribution may be incorporated in various components of the system of FIG. 10 such as, for example, the developer experience 1015, the service infrastructure 1011a-1011n, etc.

The processes described herein for providing biometric information processing using distributed computation may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
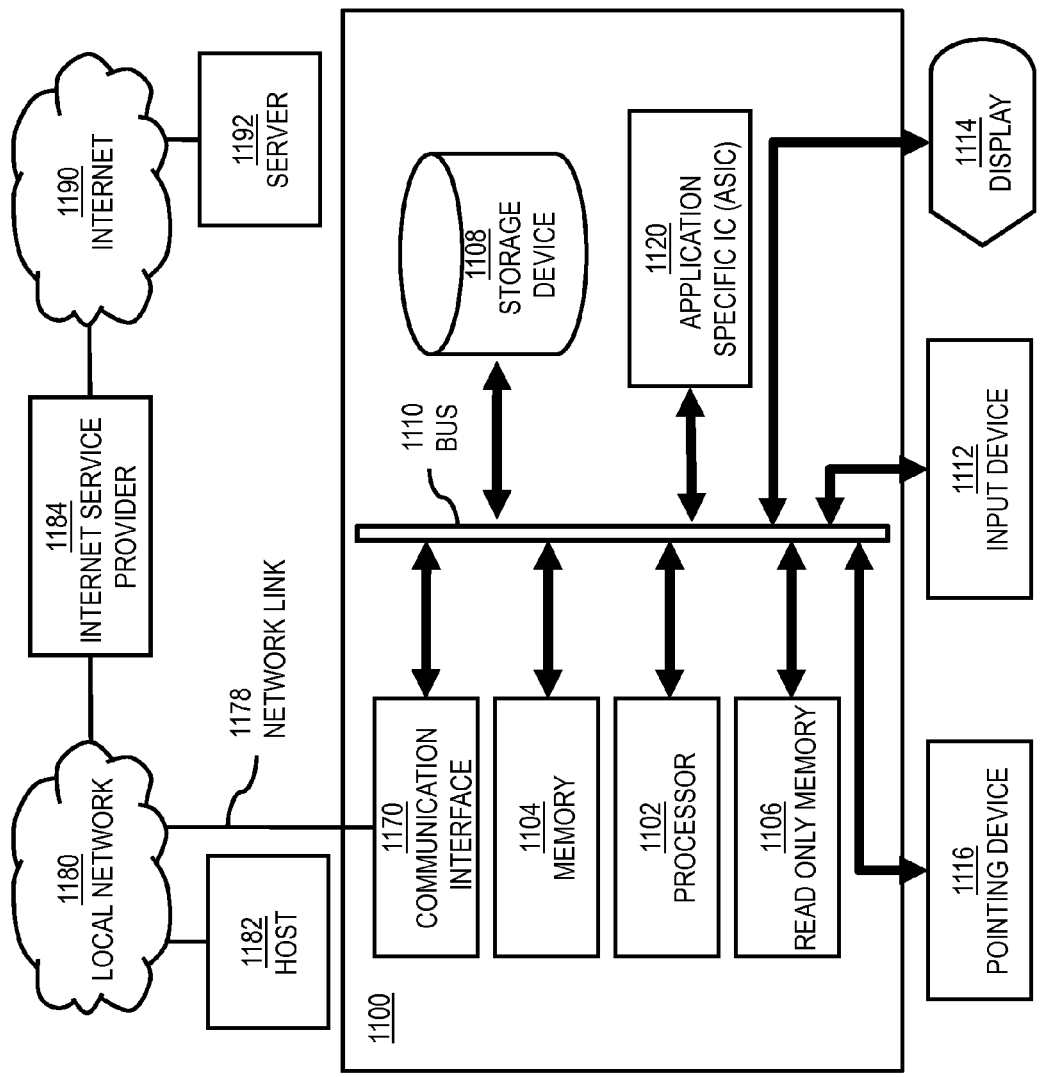
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide biometric information processing using distributed computation as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing biometric information processing using distributed computation.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to biometric information processing using distributed computation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing biometric information processing using distributed computation. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing biometric information processing using distributed computation, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing biometric information processing using distributed computation to the UE 107.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other nonvolatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
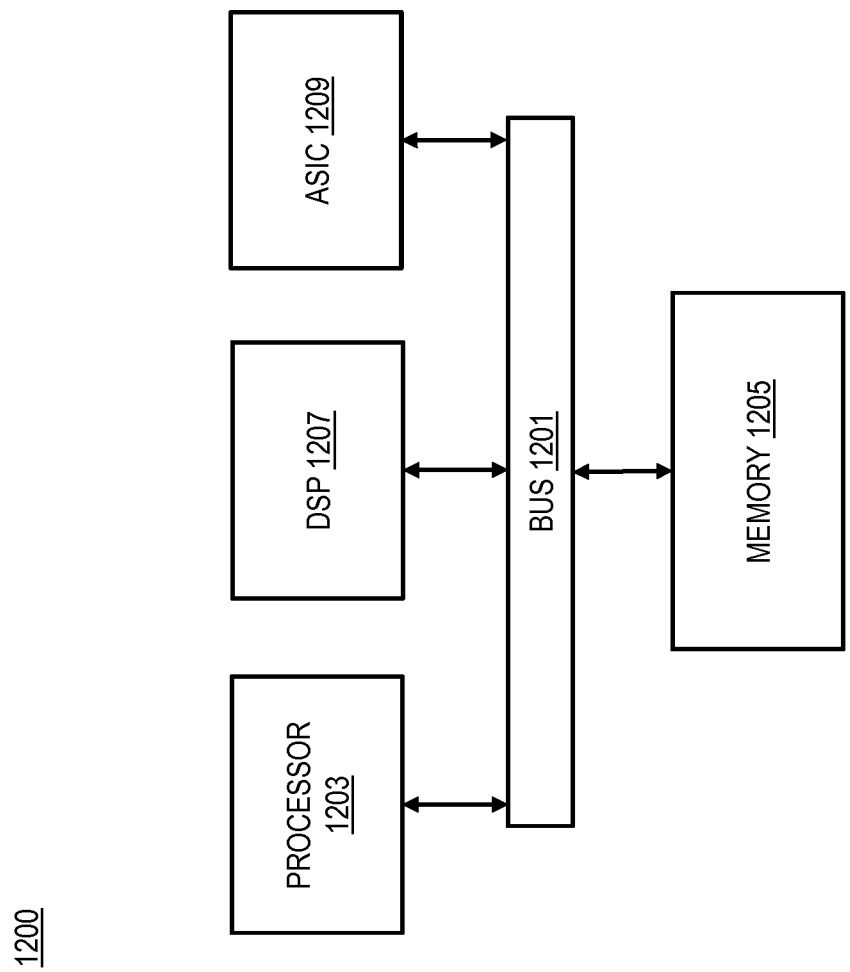
FIG. 12 is a diagram of a chip set that can be used to implement an embodiment of the invention.

FIG. 12 illustrates a chip set or chip 1200 upon which an embodiment of the invention may be implemented. Chip set 1200 is programmed to provide biometric information processing using distributed computation as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of services. Chip set or chip 1200, or a portion thereof, constitutes a means for performing one or more steps of providing biometric information processing using distributed computation.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide biometric information processing using distributed computation. The memory 1205 also stores the data associated with or generated by the execution of the inventive steps.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing biometric information processing using distributed computation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing biometric information processing using distributed computation. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide biometric information processing using distributed computation. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving an input including, at least in part, biometric information, wherein receiving the input comprises converting the biometric information into an electrical signal;
   determining one or more analyses for processing the input;
   determining one or more processes associated with the one or more analyses;
   deriving one or more computation closures from the one or more processes;
   decomposing the one or more computation closures; and distributing the one or more computation closures among one or more users of one or more computation spaces, wherein the method is performed by at least one processor.

2. A method of claim 1, further comprising:
determining a computation element based, at least in part, on the biometric information, wherein the computation element comprises the one or more processes, the one or more computation closures, one or more corresponding information sets, or a combination thereof.

3. A method of claim 1, wherein the distributing the one or computation closures is based, at least in part, on the biometric information.

4. A method of claim 1, further comprising:
initiating computation of the one or more computation closures;
storing computation results in the one or more computation closures; and
gathering the computation results of the one or more computation closures.

5. A method of claim 4, wherein the computation results are one or more isomorphic transformations.

6. A method of claim 4, wherein the input is a natural language input and the one or more analyses include a semantic analysis of the input, and wherein the method of claim 4 further comprising:
estimating an outcome of the semantic analysis; and
binding the one or more computation closures to one or more primitive processes and thereby generating corresponding one or more primitive computation closures.

7. A method of claim 6, further comprising:
determining that at least a portion of the one or more derived computation closures are not decomposed;
refining the one or more primitive computation closures, wherein the refining is based, at least in part, on the one or more primitive computation closures, the one or more primitive processes, or a combination thereof; and
decomposing the at least a portion of the one or more derived computation closures.

8. A method of claim 6, further comprising:
determining that all or substantially all of the one or more derived computation closures are decomposed; and
based, at least in part, on the determination that all or substantially all of the one or more derived computation closures are decomposed, initiating distribution of the one or more primitive computation closures.

9. A method of claim 8, further comprising:
initiating computation of the one or more primitive computation closures;
storing computation results in the one or more primitive computation closures;
gathering the computation results of the one or more primitive computation closures;
binding the computation results of the one or more primitive computation closures to one or more user interface elements respectively; and
rendering the one or more user interface elements, the computation results of the computation of the one or more primitive computation closures, or a combination thereof.

10. A method of claim 1, wherein the one or more analyses include signal processing analysis, semantic analysis, pitch analysis, isomorphic transformation, or a combination thereof.

11. A method of claim 1 further comprising:
constructing a computational graph; and
binding the computational graph to each of the one or more computation closures.

12. An apparatus comprising:
at least one processor; and
at least one memory including computer program code for one or more programs,
the at least one memory and the computer program code configured to, with the at least one processor, cause the apparatus to perform at least the following,
receive an input including, at least in part, biometric information, wherein receiving the input comprises converting the biometric information into an electrical signal;
determine one or more analyses for processing the input;
determine one or more processes associated with the one or more analyses;
derive one or more computation closures from the one or more processes;
decompose the one or more computation closures; and
distribute the one or more computation closures among one or more users of one or more computation spaces.

13. An apparatus of claim 12, wherein the apparatus is further caused to:
determine a computation element based, at least in part, on the biometric information, wherein the computation element comprises the one or more processes, the one or more computation closures, one or more corresponding information sets, or a combination thereof.

14. An apparatus of claim 12, wherein the distributing the one or computation closures is based, at least in part, on the biometric information.

15. An apparatus of claim 12, wherein the apparatus is further caused to:
initiate computation of the one or more computation closures;
store computation results in the one or more computation closure; and
gather the computation results of the one or more computation closures.

16. An apparatus of claim 15, wherein the computation results are one or more isomorphic transformations.

17. An apparatus of claim 15, wherein the input is a natural language input and the one or more analyses include a semantic analysis of the input, and wherein the apparatus of claim 14 further caused to:
estimate an outcome of the semantic analysis; and
bind the one or more computation closures to one or more primitive processes and thereby generate corresponding one or more primitive computation closures.

18. An apparatus of claim 17, wherein the apparatus is further caused to:
determine that at least a portion of the one or more derived computation closures are not decomposed;
refine the one or more primitive computation closures, wherein the refining is based, at least in part, on the one or more primitive computation closures, the one or more primitive processes, or a combination thereof; and
decompose the at least a portion of the one or more derived computation closures.

19. An apparatus of claim 17, wherein the apparatus is further caused to:
determine that all or substantially all of the one or more derived computation closures are decomposed; and
based, at least in part, on the determination that all or substantially all of the one or more derived computation closures are decomposed, initiate distribution of the one or more primitive computation closures.

20. An apparatus of claim 19, wherein the apparatus is further caused to:
- initiate computation of the one or more primitive computation closures;
- store computation results in the one or more primitive computation closures;
- gather the computation results of the one or more primitive computation closures;
- bind the computation results to one or more user interface elements respectively; and
- render the one or more user interface elements, the computation results of the computation of the one or more primitive computation closures, or a combination thereof.

21. An apparatus of claim 12, wherein the one or more analyses include signal processing analysis, semantic analysis, pitch analysis, isomorphic transformation, or a combination thereof.

22. An apparatus of claim 12, wherein the apparatus is further caused to:
- construct a computational graph; and
- bind the computational graph to each of the one or more computation closures.

* * * * *